US011737856B2

(12) United States Patent
Domroese et al.

(10) Patent No.: US 11,737,856 B2
(45) Date of Patent: Aug. 29, 2023

(54) REMOVABLE DENTAL APPLIANCE WITH GINGIVAL RIDGES

(71) Applicant: 3M INNOVATIVE PROPERTIES COMPANY, St. Paul, MN (US)

(72) Inventors: Michael K. Domroese, Woodbury, MN (US); David K. Cinader, Jr., Woodbury, MN (US); Richard E. Raby, Lino Lakes, MN (US); James D. Hansen, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/290,310

(22) PCT Filed: Oct. 31, 2019

(86) PCT No.: PCT/IB2019/059357
§ 371 (c)(1),
(2) Date: Apr. 30, 2021

(87) PCT Pub. No.: WO2020/099973
PCT Pub. Date: May 22, 2020

(65) Prior Publication Data
US 2022/0047358 A1    Feb. 17, 2022

Related U.S. Application Data

(60) Provisional application No. 62/767,848, filed on Nov. 15, 2018.

(51) Int. Cl.
*A61C 7/08* (2006.01)
*A61C 7/00* (2006.01)

(52) U.S. Cl.
CPC ............... *A61C 7/08* (2013.01); *A61C 7/002* (2013.01)

(58) Field of Classification Search
CPC ................................. A61C 7/08; A61C 7/002
See application file for complete search history.

(56) References Cited

U.S. PATENT DOCUMENTS 3,898,736 A * 8/1975 Bergersen ............... A61C 7/08
433/6
4,139,944 A * 2/1979 Bergersen ............... A61C 7/08
433/6

(Continued)

FOREIGN PATENT DOCUMENTS

WO          0180762 A3    11/2001
WO    WO 2007-084727      7/2007

(Continued)

OTHER PUBLICATIONS

International Search Report for PCT International Application No. PCT/IB2019/059357, dated Jan. 21, 2020, 3 pages.

*Primary Examiner* — Nicholas D Lucchesi

(57) ABSTRACT

An example removable dental appliance includes an appliance body configured to at least partially surround a plurality of teeth of a dental arch of a patient. The appliance body includes a shell shaped to engage a tooth in an initial position and a gingival ridge extending from a mesial interproximal region along a gingival edge of the shell to a distal interproximal region. The gingival ridge is configured to engage a lingual or labial surface of the tooth below a height of contour of the tooth to enable the appliance body to apply a force vector at a contact point on the tooth to cause movement of the tooth toward a desired position of the tooth when the removable dental appliance is worn by the patient.

20 Claims, 17 Drawing Sheets

(56) References Cited

U.S. PATENT DOCUMENTS

| | | | |
|---|---|---|---|
| 4,345,900 A * | 8/1982 | Katz | A61C 9/00 |
| | | | 433/171 |
| 6,572,372 B1 | 6/2003 | Phan | |
| 6,845,175 B2 | 1/2005 | Kopelman | |
| 7,027,642 B2 | 4/2006 | Rubbert | |
| 7,121,825 B2 | 10/2006 | Chishti | |
| 7,234,937 B2 | 6/2007 | Sachdeva | |
| 7,731,495 B2 | 6/2010 | Eisenberg | |
| 7,831,322 B2 | 11/2010 | Liu | |
| 7,882,839 B2 * | 2/2011 | Ambis, Jr. | A63B 71/085 |
| | | | 128/861 |
| 8,194,067 B2 | 6/2012 | Raby | |
| 8,348,665 B2 | 1/2013 | Kuo | |
| 8,439,672 B2 | 5/2013 | Matov | |
| 8,469,706 B2 | 6/2013 | Kuo | |
| 8,491,306 B2 | 7/2013 | Raby | |
| 8,517,726 B2 | 8/2013 | Kakavand | |
| 8,738,165 B2 | 5/2014 | Cinader, Jr. | |
| 8,897,902 B2 | 11/2014 | See | |
| 8,899,977 B2 | 12/2014 | Cao | |
| 8,944,812 B2 | 2/2015 | Kuo | |
| 9,022,781 B2 | 5/2015 | Kuo | |
| 9,191,648 B2 | 11/2015 | Kriveshko | |
| 9,245,374 B2 | 1/2016 | McQueston | |
| 2006/0199142 A1 | 9/2006 | Liu | |
| 2007/0231765 A1 * | 10/2007 | Phan | A61C 19/003 |
| | | | 433/6 |
| 2013/0325431 A1 | 12/2013 | See | |
| 2015/0157421 A1 * | 6/2015 | Martz | A61C 7/08 |
| | | | 433/6 |
| 2015/0265376 A1 | 9/2015 | Kopelman | |
| 2017/0007359 A1 | 1/2017 | Kopelman | |
| 2017/0007360 A1 | 1/2017 | Kopelman | |
| 2017/0007361 A1 | 1/2017 | Boronkay | |
| 2017/0007365 A1 | 1/2017 | Kopelman | |
| 2017/0065373 A1 * | 3/2017 | Martz | A61C 7/08 |
| 2017/0252117 A1 * | 9/2017 | Sanders | A61B 46/20 |

FOREIGN PATENT DOCUMENTS

| | | |
|---|---|---|
| WO | WO 2011-135438 | 11/2011 |
| WO | WO 2013-121281 | 8/2013 |
| WO | WO 2018-106527 | 6/2018 |
| WO | WO 2018-167616 | 9/2018 |
| WO | WO 2020-099990 | 5/2020 |

* cited by examiner

REMOVABLE DENTAL APPLIANCE WITH GINGIVAL RIDGES

CROSS REFERENCE TO RELATED APPLICATIONS

This application is a national stage filing under 35 U.S.C. 371 of PCT/IB2019/059357, filed 31 Oct. 2019, which claims the benefit of U.S. Provisional Application No. 62/767,848, filed 15 Nov. 2018, the disclosures of which are incorporated by reference in their entireties herein.

TECHNICAL FIELD

This disclosure relates to polymer-based removable dental appliances such as tooth aligners.

BACKGROUND

The field of orthodontics relates to repositioning a patient's teeth for improved function and aesthetic appearance. Orthodontic devices and treatment methods generally involve the application of forces to move teeth into a proper bite configuration, or occlusion. As one example, orthodontic treatment may involve the use of slotted appliances, known as brackets, which are fixed to the patient's anterior, cuspid, and bicuspid teeth. An archwire may be placed in the slot of each bracket and serves as a track to guide movement of the teeth to desired orientations. The ends of the archwire are received in appliances known as buccal tubes that are secured to the patient's molar teeth. Such dental appliances remain in the mouth of the patient and are periodically adjusted by an orthodontist until proper alignment is achieved.

Orthodontic treatment may also involve the use of alignment trays, such as clear or transparent, polymer-based tooth positioning trays, often referred to as clear tray aligners (CTAs). For example, orthodontic treatment with CTAs may include forming a tray having shells that engage one or more teeth. Each shell may have a shape that is deformed upon being installed over the patient's teeth. The deformed position of a respective shell of the CTA may apply a force to a respective tooth toward a desired position of the tooth that is an intermediate position between an initial position of the respective tooth and a final position resulting from the orthodontic treatment. However, orthodontic treatment may require some tooth movements that are difficult for a CTA to achieve, such as, for example, tooth root movements and rotations of cuspids and bicuspids. In these instances, the forces and moments that a CTA is capable of applying directly to the surfaces of a tooth may be insufficient to achieve the desired tooth movement.

SUMMARY

Clear tray aligners often require attachments to achieve difficult tooth movements such as root movements and tooth rotations. Bonding attachments to the teeth is time consuming and can be problematic. Attachments are not aesthetically desirable and also make it difficult for patients to remove aligner trays from teeth. The disclosed removable dental appliances including gingival ridges facilitate difficult tooth movements without requiring the use of tooth attachments.

In some examples, a removable dental appliance may include an appliance body configured to at least partially surround a plurality of teeth of a dental arch of a patient, where the appliance body includes a shell shaped to engage a tooth of the plurality of teeth in an initial position of the tooth; and a gingival ridge extending at least from a first interproximal region of the appliance body at a mesial portion of the shell along a gingival edge of the shell to a second interproximal region of the appliance body at a distal portion of the shell, where the gingival ridge is configured to engage a lingual surface of the tooth below a height of contour of the tooth or a labial surface of the tooth below the height of contour to enable the appliance body to apply a force vector at a contact point on the tooth to cause movement of the tooth toward a desired position of the tooth when the removable dental appliance is worn by the patient.

In some examples, a system may include an ordered set of removable dental appliances configured to reposition one or more teeth of a patient, where at least one removable dental appliance in the set of removable dental appliances includes an appliance body configured to at least partially surround a plurality of teeth of a dental arch of a patient, where the appliance body includes a shell shaped to engage a tooth of the plurality of teeth in an initial position of the tooth; and a gingival ridge extending at least from a first interproximal region of the appliance body at a mesial portion of the shell along a gingival edge of the shell to a second interproximal region of the appliance body at a distal portion of the shell, where the gingival ridge is configured to engage a lingual surface of the tooth below a height of contour of the tooth or a labial surface of the tooth below the height of contour to enable the appliance body to apply a force vector at a contact point on the tooth to cause movement of the tooth toward a desired position of the tooth when the removable dental appliance is worn by the patient.

In some examples, a method may include forming a model of dental anatomy of a patient providing desired positions of a plurality of teeth; and forming, based on the model, a removable dental appliance including an appliance body configured to at least partially surround a plurality of teeth of a dental arch of a patient, where the appliance body includes a shell shaped to engage a tooth of the plurality of teeth in an initial position of the tooth; and a gingival ridge extending at least from a first interproximal region of the appliance body at a mesial portion of the shell along a gingival edge of the shell to a second interproximal region of the appliance body at a distal portion of the shell, where the gingival ridge is configured to engage a lingual surface of the tooth below a height of contour of the tooth or a labial surface of the tooth below the height of contour to enable the appliance body to apply a force vector at a contact point on the tooth to cause movement of the tooth toward a desired position of the tooth when the removable dental appliance is worn by the patient.

In some examples, a method may include receiving, by a computing device, a digital representation of a three-dimensional dental anatomy of a patient, the dental anatomy providing initial positions of a plurality of teeth; determining, by the computing device, a movement of a tooth of the plurality of teeth from the initial position of the tooth to a desired position of the tooth; determining, by the computing device, a force vector applied at a contact point on the tooth to achieve the movement; determining, by the computing device, a removable dental appliance design including a position of a gingival ridge on a removable dental appliance to cause the force vector, where the removable dental appliance includes an appliance body configured to at least partially surround a plurality of teeth of the patient, where the appliance body includes a shell shaped to engage the tooth in the initial position of the tooth; and a gingival ridge extending at least from a first interproximal region of the appliance body at a mesial portion of the shell along a gingival edge of the shell to a second interproximal region of the appliance body at a distal portion of the shell, where the gingival ridge is configured to engage a lingual surface of the tooth below a height of contour of the tooth or a labial surface of the tooth below the height of contour to enable the appliance body, and where the gingival ridge results in a gingival portion of the appliance body being stiffer than a labial face of the shell or a lingual face of the shell; and transmitting, by the computing device, a representation of the removable dental appliance to a computer-aided manufacturing system.

In some examples, a non-transitory computer-readable storage medium that stores computer system-executable instructions that, when executed, configure a processor to receive a digital representation of a three-dimensional dental anatomy of a patient, the dental anatomy providing initial positions of a plurality of teeth; determine a movement of a tooth of the plurality of teeth from the initial position of the tooth to a desired position of the tooth; determine a force vector applied at a contact point on the tooth to achieve the movement; determine a removable dental appliance design including a position of a gingival ridge on a removable dental appliance to cause the force vector, where the removable dental appliance includes an appliance body configured to at least partially surround a plurality of teeth of the patient, where the appliance body includes a shell shaped to engage the tooth in the initial position of the tooth; and a gingival ridge extending at least from a first interproximal region of the appliance body at a mesial portion of the shell along a gingival edge of the shell to a second interproximal region of the appliance body at a distal portion of the shell, where the gingival ridge is configured to engage a lingual surface of the tooth below a height of contour of the tooth or a labial surface of the tooth below the height of contour to enable the appliance body, and where the gingival ridge results in a gingival portion of the appliance body being stiffer than a labial face of the shell or a lingual face of the shell; and transmit a representation of the removable dental appliance to a computer-aided manufacturing system.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1A:
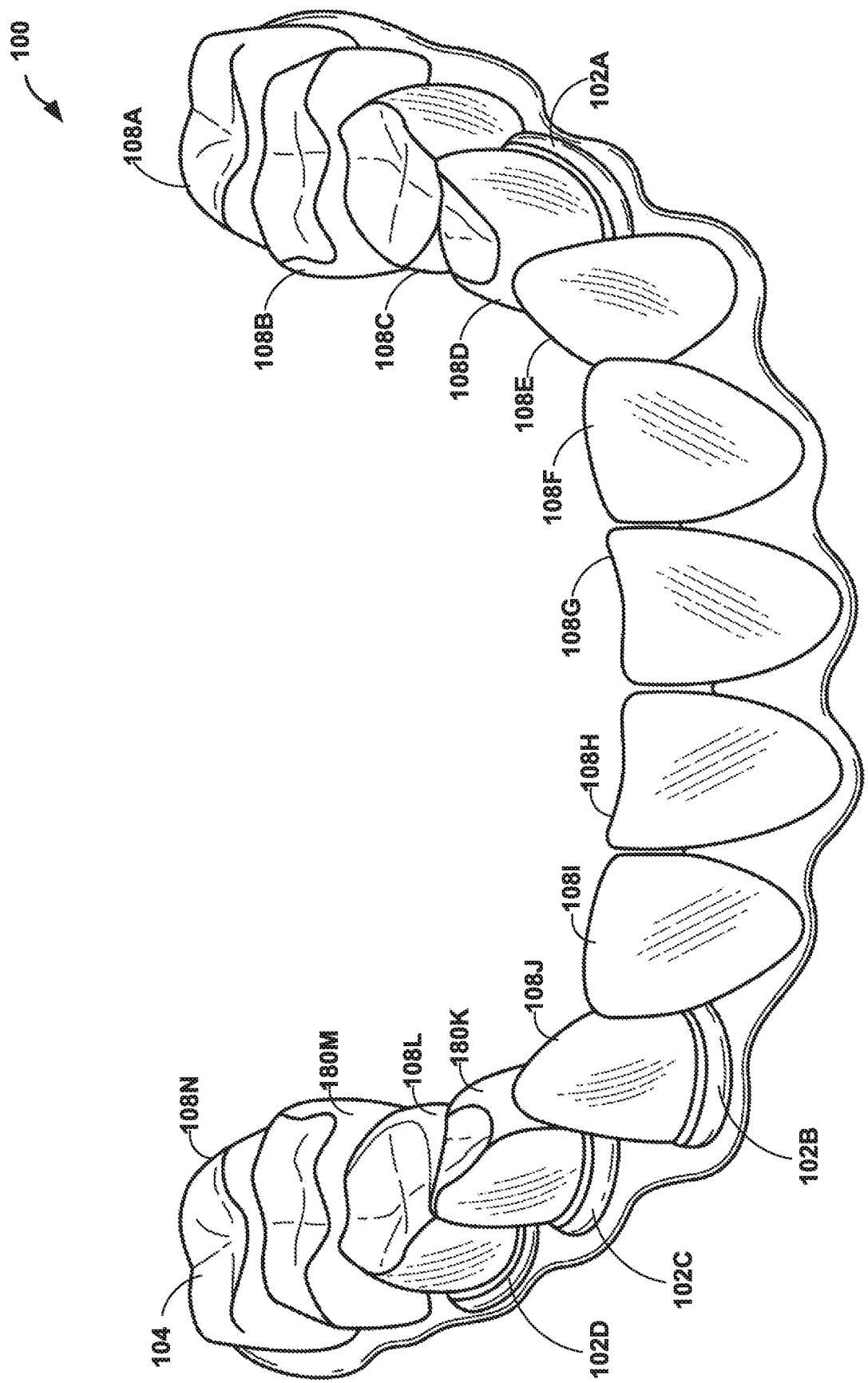
FIGS. 1A-1H illustrate different views of an example removable dental appliance that includes an appliance body having gingival ridges.

The disclosed removable dental appliances include gingival ridges that facilitate difficult tooth movements using a removable dental appliance without using tooth attachments. Clear tray aligners (CTAs), which are a type of removable dental appliance, are often used with attachments bonded to the surface of a tooth to achieve difficult tooth movements such as root movements and tooth rotations. The attachment acts as a handle on the tooth. Corresponding receptacles or apertures in the CTA engage with the attachments. The CTA can then apply forces and moments to teeth via the tooth attachment.

Bonding attachments to the teeth, however, is time consuming and can be problematic. Typical tooth attachments are bonded to the teeth with an attachment tray including pockets filled with a composite restorative. The attachment tray is placed on the patient's teeth and the composite restorative is bonded to the teeth. Under filling the pockets may result in the attachments debonding from the teeth. Over filling the pockets may result in excess composite restorative on the tooth surface (i.e., flash) that must be removed by grinding. If an attachment is not properly located or formed during the bonding process, the attachment may be removed by grinding the composite restorative, and a new attachment bonded to the tooth. Attachments that have not been well formed and located on the teeth can compromise the forces and moments that a CTA is capable of applying to teeth and may result in undesirable positions of the teeth at the end of orthodontic treatment. Also, during orthodontic treatment, the position of some teeth may lag the intended position in the treatment plan. The tooth position may lag significantly enough that the attachment on the tooth no longer engages properly into the corresponding receptacle or aperture in the CTA. In these circumstances, the CTA may become ineffective at applying desired forces to the tooth attachment and may even apply forces to the attachment in undesirable directions or with undesirable magnitudes that may move the tooth off course from the desired location in the treatment plan.

From the patient's perspective, tooth attachments may be uncomfortable, e.g., intruding on the tongue and inside of the cheeks, particularly when a CTA is not in the mouth covering the attachments. Attachments also may be aesthetically undesirable as the attachment and corresponding receptacles or aperture in the CTA are more conspicuous than a smooth CTA surface following the natural contour of the teeth. In addition, attachments on the teeth make removal of the CTA from the teeth considerably more difficult. The patient must remove CTAs from the mouth every time they eat or perform oral hygiene tasks. Particularly when a patient first has attachments bonded to their teeth, they can find removal of the CTA to be frustrating, uncomfortable, and time-consuming. Attachments may tend to betray the fundamental promise of CTAs as a completely removable appliance and can engender patient disappointment and resistance.

To improve the ability of the removable dental appliances to achieve difficult tooth movements without using tooth attachments, the disclosure describes removable dental appliances and orthodontic treatment techniques that include at least one gingival ridge in the removable dental appliance. Example removable dental appliances include an appliance body configured to at least partially surround two or more teeth of a dental arch of a patient. The appliance body includes a shell configured to receive one or more teeth of a patient and a gingival ridge extending from a first interproximal region of the appliance body at a mesial portion of the shell along a gingival edge of the shell to a second interproximal region of the appliance body at a distal portion of the shell. The gingival ridge enhances the stiffness of the gingival portion of the removable dental appliance, e.g., near the gingival margin. When worn by the patient, the enhanced stiffness of the gingival portion of the removable dental appliance may enhance contact between the removable dental appliance and the teeth below the respective height of contour of the respective teeth, e.g., near the gingival margin of the respective teeth. Enhancing contact below the height of contour increases retention of the removable dental appliance on the teeth and improves engagement of the removable dental appliance with the respective occlusal surfaces of the respective teeth. Enhancing contact below the height of contour and increasing engagement of the occlusal surfaces may improve the ability of the removable dental appliance to cause desired movements of teeth without attachments on the teeth.

During use of the removable dental appliance, engagement of the removable dental appliance with the teeth of the patient results in at least some of the removable dental appliance being deformed, e.g., from a physical configuration in which the removable dental appliance was formed to a configuration in which one or more teeth of the patient are received in the shell of the removable dental appliance. Deformation of the removable dental appliance results in a force being created in the shell and/or gingival ridge, such as, for example, compression, tension, shear, bending, or torsion forces. The force on the shell and/or the gingival ridge acts as a restorative force urging the shell and/or the gingival ridge in one or more directions that would result in the removable dental appliance becoming less deformed.

The restorative force results in force vectors at respective contact points on one or more teeth of the patient. For example, in a deformed configuration, respective shells of the removable dental appliance engage respective teeth at one or more contact points whereby the restorative force is transmitted to the teeth. By enhancing stiffness of the gingival portion of the appliance body and engagement of the teeth near the gingival and occlusal surface, the gingival ridge improves the determinability of the location contact points, e.g., as the removable dental appliance moves from the deformed configuration toward an undeformed configuration, and enables a greater force moment, e.g., torque, to be applied to a respective tooth. In this way, the gingival ridges improve the predictability of the magnitude and the direction of force vectors on the teeth to cause bone remodeling near the root of the respective teeth and produce desired tooth movements without bonding attachments to the teeth.

Additionally, or alternatively, deformation of the stiffened gingival portion of the appliance body, if any, may result in a force that is distributed by the gingival ridge to portions of the removable dental appliance adjacent to the gingival ridge, such as, for example, adjacent shells or adjacent gingival ridges. Distribution of force in a gingival ridge to adjacent portions of the removable dental appliance may concentrate deformation to a selected shell. Concentrating deformation to the selected shell may improve control of magnitude and direction of force vectors applied to the teeth by the selected shell when the removable dental appliance is worn by the patient. In this way, the gingival ridges improve control of force vectors on the teeth to cause bone remodeling near the root of the respective teeth and produce desired tooth movements without bonding attachments to the teeth. Additionally, or alternatively, gingival ridges may reduce the rate of the applied force degradation due to wear, material creep, stretching, moisture absorption, or the like. Sustaining applied forces to teeth at a desired magnitude for a longer time period will better sustain the rate of tooth movement, reduce the overall treatment time, and/or increase the duration a single removable dental appliance may be used during the course of orthodontic treatment.

FIG. 1A-1H illustrate an example removable dental appliance 100 that includes a plurality of gingival ridges 102A-102D (collectively, "gingival ridges 102"). Removable dental appliance 100 includes an appliance body 104 configured to at least partially surround a plurality of teeth of either the maxillary dental arch or the mandibular dental arch of a patient. For example, as illustrated in FIG. 1A, appliance body 104 is configured to surround at least one of the facial, lingual, and occlusal surfaces of the teeth (collectively, "teeth 106") of a mandibular arch of the patient, e.g., tooth 106A. In some examples, appliance body 104 may surround different portions of different teeth 106 or overlap a portion of the gingiva of the patient. One tooth 106 is shown for purposes of illustration, although the number of teeth 106 may include all teeth 106 of the patient, such as, for example, fourteen teeth, less than fourteen (e.g., a patient having one or more extracted teeth), or more than fourteen (e.g., a patient having wisdom teeth or hyperdontia).

Removable dental appliance 100 may include an aligner tray. For example, appliance body 104 may include a plurality of tooth shells 108A-108N (collectively, "shells 108") and gingival ridges 102. Each respective shell of shells 108 is shaped to receive at least one respective tooth of teeth 106. For example, shell 108D may be shaped to receive tooth 106A. In some examples, appliance body 104 may define a respective shell of shells 108 for each respective tooth of teeth 106. In other examples, appliance body 104 may define fewer shells than teeth, e.g., a shell may receive more than one tooth or at least one of teeth 106 may not be surrounded by a shell of shells 108. In other examples, appliance body 104 may define more shells 108 than teeth 106, e.g., two or more shells or shell-like portions may surround at least a portion of at least one tooth or a shell in place to receive an unerupted tooth.

In some examples, a respective shell of shells 108 may be shaped to engage a contact point including at least one selected location having selected surface area of a respective tooth of teeth 106. In some examples, shells 108 may surround the facial, lingual, and occlusal portions of teeth 106. In some examples, shells 108 may surround fewer portions of teeth 106, such as, for example, only the facial and lingual portions, or only one of the facial or lingual portions of teeth 106. By selecting the shape of a respective shell of shells 108, removable dental appliance 100 may control the location(s) and direction(s) of force(s) applied to a respective tooth of teeth 106. In some examples, a thickness of a respective shell of shells 108 may range between about 0.10 millimeters and about 2.0 millimeters, such as between about 0.2 and about 1.0 millimeters, or between 0.30 millimeters and 0.75 millimeters.

Figure 1B:
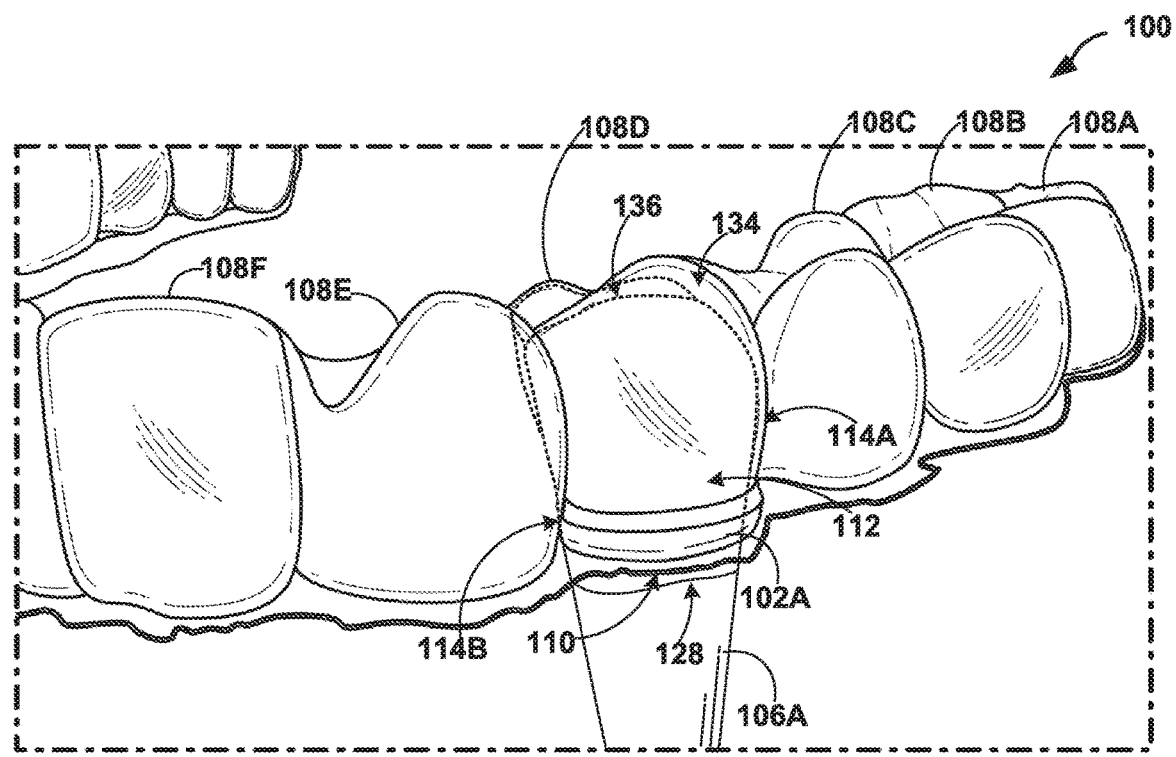
Figure 1C:
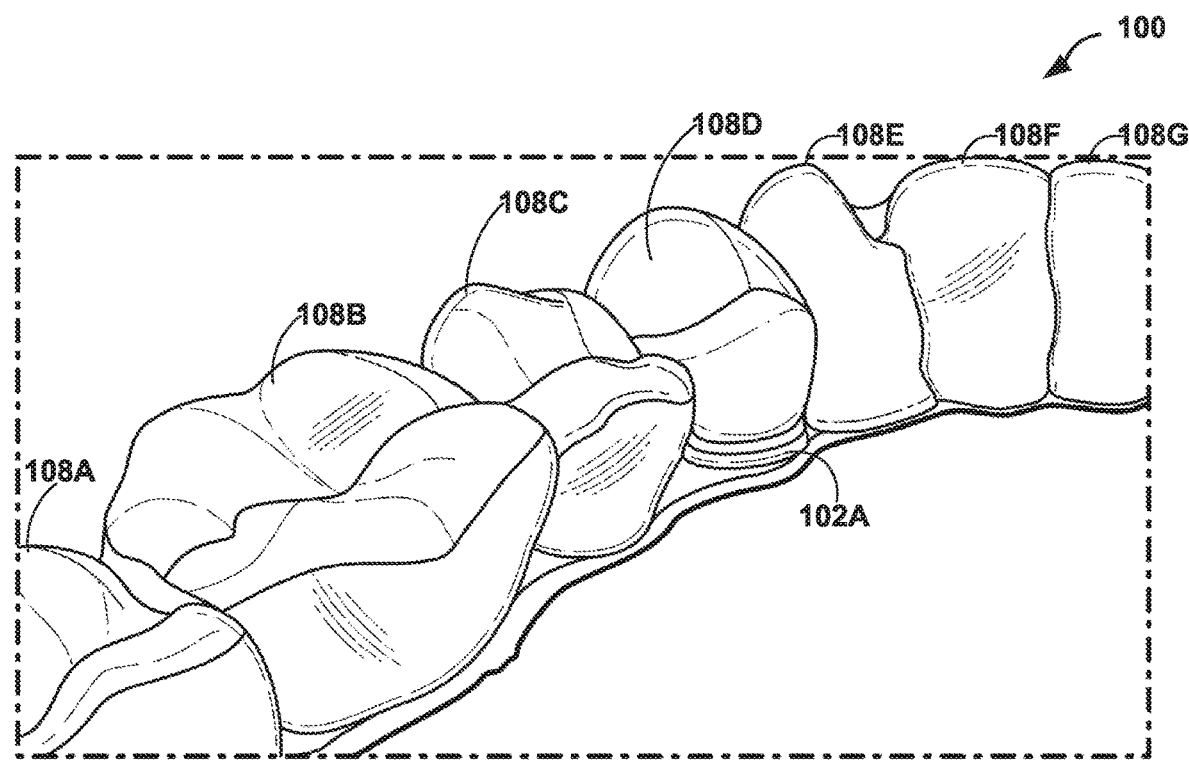
Figure 1D:
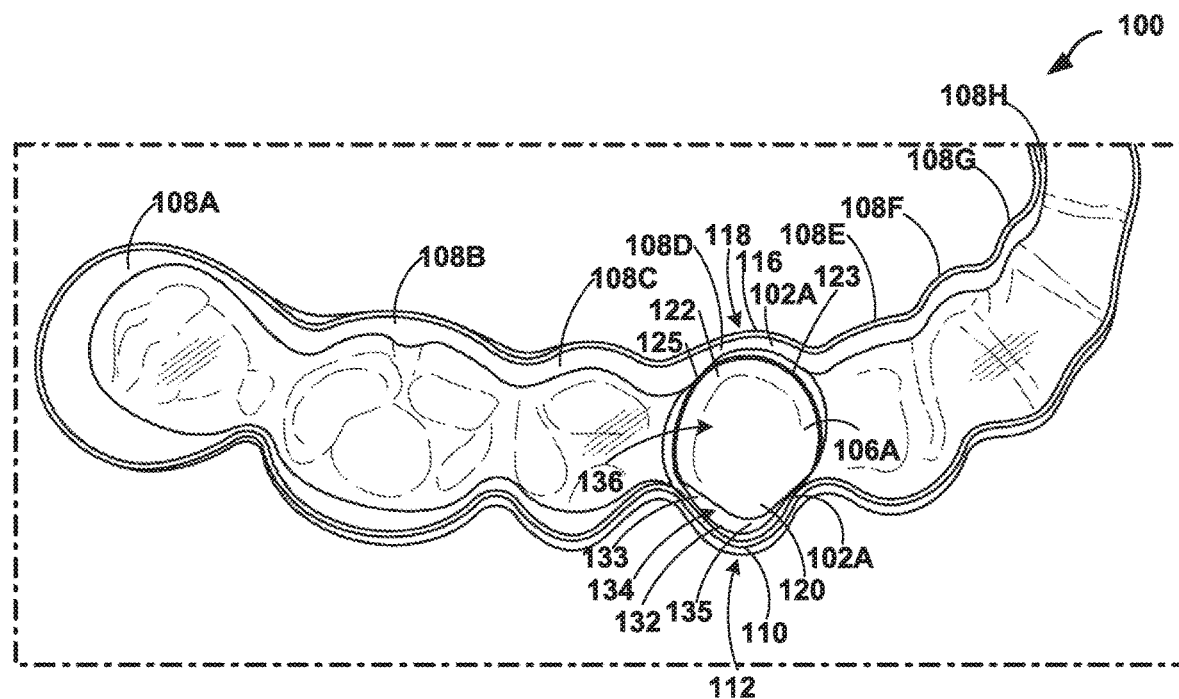

In some examples, a respective shell of shells 108 may include a surface that defines a void internal to the respective shell, the surface shaped to receive respective tooth in a desired position. For example, as best illustrated in FIGS. 1B and 1D, shell 108D includes an interior surface 132 that defines a void 134 internal to shell 108D. Surface 132 is shaped to receive tooth 106A in a desired position of tooth 106A. For example, removable dental appliance 100 may urge an occlusal surface 136 of tooth 106A from an initial position of tooth 106A toward a desired position of tooth 106A, such that occlusal surface 136 at least partially engages with surface 132.

Appliance body 104 may include one or more anchor shells configured to receive one or more anchor teeth. In some examples, anchor teeth may include one or more molar teeth, premolar teeth, or both, and anchor shells may include corresponding shells, such as, for example, shells 108A-108D and 108K-108N. In other examples, anchor teeth may include one or more anterior teeth, or a combination of one or more anterior and posterior teeth. Anchor shells may be configured to allow portions of appliance body 104 to deform to result in a force sufficient to move one or more teeth (e.g., force sufficient to cause alveolar bone remodeling) without resulting in sufficient force to move the respective anchor teeth. In other examples, appliance body 104 may omit any one or more of anchor shells 108A-108D and 108K-108N.

Appliance body 104 includes gingival ridges 102. Gingival ridges 102 may include any suitable height, e.g., extending in the gingival-occlusal direction. For example, the height of a respective gingival ridge of gingival ridges 102 may be between about 0.5 millimeter (mm) and about 10 mm, such as between about 1 mm and about 5 mm. Gingival ridges 102 may include any suitable thickness, e.g., extending from interior surface 124 of appliance body 104 into void 134. For example, the thickness of a respective gingival ridge of gingival ridges 102 may be between about 0.025 millimeter and about 1.0 millimeters, or between about 0.1 millimeters and about 0.75 millimeters, or between about 0.15 and about 0.6 millimeters, or about 0.3 millimeters. In some examples, gingival ridges 102 may include a step change in thickness of appliance body 104, e.g., a non-tapered change in total thickness of appliance body 104 from a thickness of a respective shell of shells 108 to a thickness of the respective shell and a respective gingival ridge of gingival ridges 102. In some examples, gingival ridges 102 may include a tapered change in thickness of appliance body 104. Gingival ridges 102 may include any suitable length, e.g., extending in the mesial-distal direction. For example, a respective gingival ridge of gingival ridges 102 may extend the entire distance from a first interproximal region mesial of a respective shell to a second interproximal region distal of the respective shell. By extending to interproximal regions mesial and/or distal to a respective shell of shells 108, a respective gingival ridges 102 may enhance the stiffness of the respective shell at the gingival ridge by physically coupling to the relatively stiffer interproximal region of the appliance body 104 (e.g., compared to the relatively more flexible shell). In some examples, gingival ridges 102 may extend across one or more interproximal regions. By extending across one or more interproximal regions, gingival ridges 102 may stiffen two or more adjacent shells at gingival ridges 102.

Figure 1E:
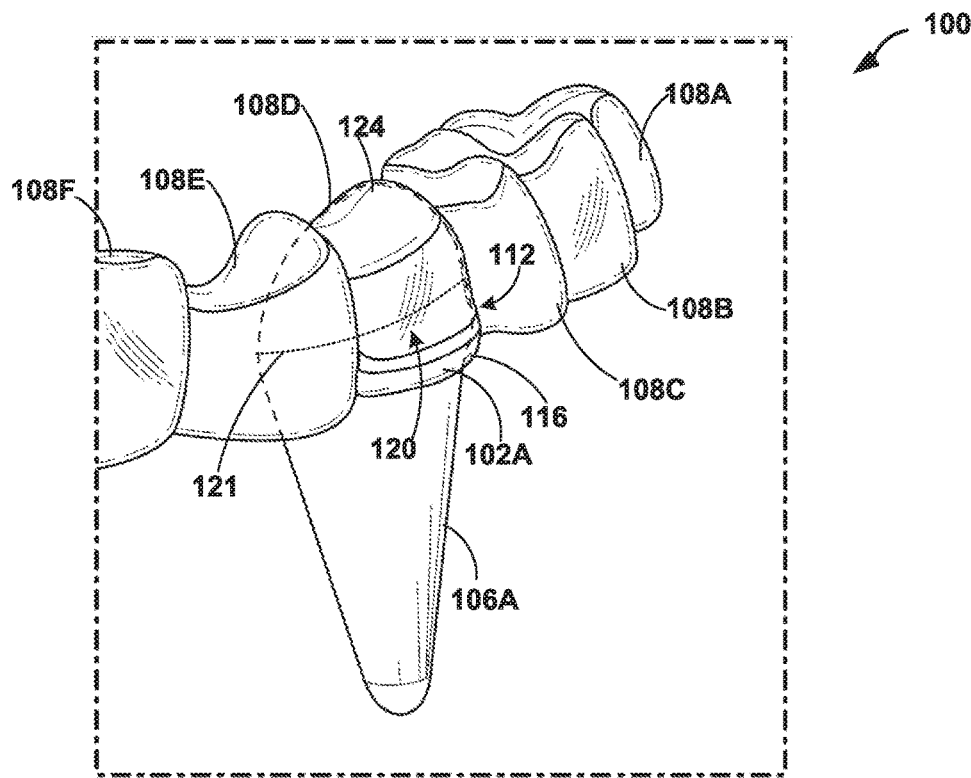
Figure 1F:
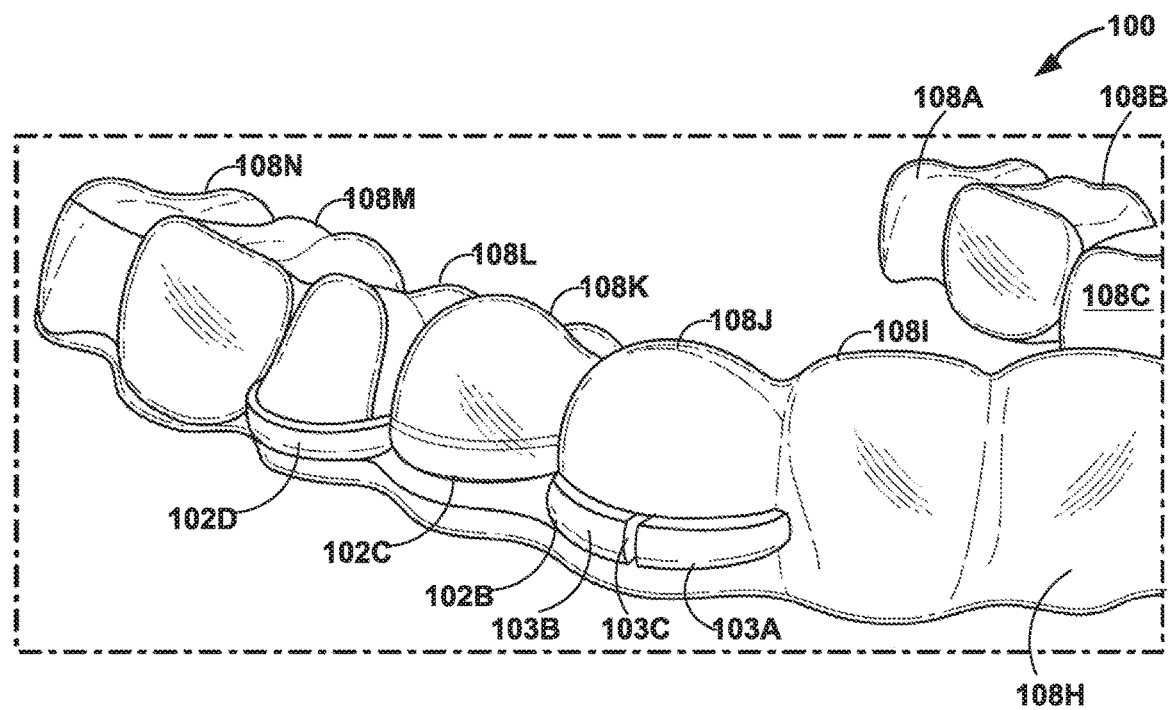

In some examples, gingival ridges 102 may extend across less than the entire mesial-distal length between one or more interproximal regions. For example, a respective gingival ridge of gingival ridges 102 may extend across a portion of a respective shell of shells 108. In some examples, a respective gingival ridge of gingival ridges 102 may include a plurality of segments. Each segment of the plurality of segments may traverse a portion of the distance from a first interproximal region mesial to a second interproximal region distal to the respective shell. For example, as illustrated in FIG. 1F, gingival ridge 102B may include a mesial segment 103A and a distal segment 103B defining a flexible region 103C between mesial segment 103A and a distal segment 103B. By including a plurality of segments, the respective gingival ridge may allow for selected flexible regions between each segment of the plurality of segments. The selected flexibility at the selected flexible regions may enable better control of direction(s) and magnitude(s) of force(s) applied by the appliance body 104 to teeth 106 compared to gingival ridges 102 without a plurality of segments.

A respective gingival ridge of gingival ridges 102 may be positioned at or near a gingival-most edge of appliance body 104. For example, gingival ridges 102 may be positioned up to about 3 millimeters, such as between about 1 millimeter and about 2 millimeters, from the gingival edge of appliance body 104 or a gingival margin of teeth 106 when removable dental appliance 100 is worn by the patient. In some examples, gingival ridges 102 may be positioned at the gingival-most edge of appliance body 104 to reduce exposure of an edge of appliance body 104 that may otherwise be lifted off the face of teeth 106 by gingival ridges 102 and cause irritation when worn by the patient. In some examples, gingival ridges 102 may be disposed on interior surfaces (e.g. interior surface 124) of shells 108. In some examples, gingival ridges 102 may extend through appliance body 104, such that one or more portions of a respective gingival ridge of gingival ridges 102 is disposed on an interior surface of a respective shell of shells 108 and one or more different portions of the respective gingival ridge are disposed on an exterior surface of the respective shell. In some examples, a respective gingival ridge of gingival ridges 102 may be shaped to correspond to a contour of a respective tooth of teeth 106, such as, for example, to correspond to a shape of the respective tooth below the height of contour of the respective tooth. By corresponding to contours of teeth, gingival ridges 102 may better grip teeth 106 compared to gingival ridges 102 that do not follow contours of teeth 106.

The position and shape of a respective gingival ridge of gingival ridges 102 may enable the respective gingival ridge to engage a respective tooth of teeth 106. For example, as illustrated in FIGS. 1D and 1E, gingival ridge 102A is configured (e.g., positioned and shaped) to engage lingual surface 120 of tooth 106A below a height of contour 121 of tooth 106A and labial surface 122 of tooth 106A below height of contour 121. The height of contour (or crest of curvature), e.g., height of contour 121 of tooth 106A, is the location on a tooth with the greatest amount of a curve or greatest convexity or bulge, farthest from the root axis line. The region of appliance body 104 below the height of contour may include an undercut near the gingival margin. Engaging at least one of the lingual surface or the labial surface of teeth 106 below the height of contour of teeth 106 may enable appliance body 104 to enhance contact between removable dental appliance 100 and teeth 106 below the respective height of contour of the respective teeth.

Enhancing contact of appliance body 104 with a tooth of teeth 106 below the height of contour may increase retention of removable dental appliance 100 on teeth 106 and improve engagement of removable dental appliance 100 with the respective occlusal surfaces of the respective teeth. For example, enhancing contact below height of contour 121 of tooth 106A and increasing engagement of occlusal surface 136 of tooth 106A may enable removable dental appliance 100 to apply a force vector at a contact point 123 on tooth 106A to cause movement of tooth 106A toward a desired position of tooth 106A when removable dental appliance 100 is worn by the patient. In some examples, gingival ridges 102 may enable a greater moment, e.g., torque, to be applied to a respective tooth; improve the determinability of the location contact points, e.g., as removable dental appliance 100 moves from the deformed configuration to an undeformed configuration; or both compared to removable dental appliances without gingival ridges. In this way, gingival ridges 102 improve the control of the magnitude and the direction of force vectors on teeth 106 to cause bone remodeling near the root of the respective teeth and produce desired tooth movements without bonding attachments to the teeth.

Removable dental appliance 100 may be formed with an initial, undeformed shape corresponding to desired positions of teeth 106 (or intermediate positions of teeth 106), such that the shape of removable dental appliance 100 is different than a current position of teeth 106. When removable dental appliance 100 is worn by the patient, appliance body 104 may deform to allow shells 108 to receive teeth 106. The deformation of appliance body 104 may induce a force, such as at least one of compression, tension, shear, bending, and torsion, in one or more portions of appliance body 104. In some examples, the force in appliance body 104 may be concentrated in one or more shells 108. Each respective shell of shells 108 may be engaged with a respective tooth of teeth 106 and, in each respective shell of shells 108 including a force induced by the deformation of appliance body 104, cause the force to be transferred to each respective tooth of teeth 106. In this way, deformation of appliance body 104 may transfer a force, via shells 108, to the teeth 106.

Gingival ridges 102 may affect the deformation of appliance body 104. For example, without gingival ridges 102, a gingival portion of appliance body 104 (e.g., first gingival edge 110 on labial side 112 and second gingival edge 116 on lingual side 118) (referred to herein as, "gingival portions 110 and 116") may be more flexible than other portions of appliance body 104, such as an occlusal surface 124 of appliance body 104. As one example, the relative stiffness of occlusal surface 124 may be due, at least in part, to the undulated surface of occlusal surface 124 that follows the shape of the occlusal surface of teeth 106. The relative flexibility of gingival portions 110 and 116 may be due to fewer bends or folds near the gingival margin of teeth 106. Additionally, or alternatively, appliance body 104 may be thicker near occlusal surface 124 than near gingival portions 110 and 116, the relatively thinner gingival portions 110 and 116 being more flexible than the relatively thicker occlusal surface 124. Gingival ridges 102 may stiffen appliance body 104 at gingival portions 110 and 116 near gingival ridges 102. For example, gingival ridges 102 may increase resistance to twisting about a path that follows the contour of the dental arch. In some examples, the increased stiffness of the appliance body 104 with gingival ridges 102 may increase resistance to various other local (e.g., within a respective shell of shells 108) or universal (e.g., across appliance body 104) bending and twisting motions. For example, gingival ridges 102A may result in appliance body 104 at interproximal regions 114A and 114B being stiffer than labial side 112 and/or lingual side 118 of shell 108D. By stiffening gingival portions 110 and/or 116, appliance body 104 may have a more uniform stiffness characteristic at occlusal surface 124 and at gingival portions 110 and 116 compared to a removable dental appliance without gingival ridges 102.

The relatively stiffer gingival portions 110 and 116 may improve the grip of removable dental appliance 100 on teeth 106 (e.g., the amount of contact between dental appliance 100 and teeth 106). When the dental appliance is being installed on the dental arch and teeth 106 are being received in shells 108 of removable dental appliance 100, shells 108 and gingival ridges 102 deform to allow teeth 106 to enter shells 108. For example, the height of contour of tooth 106A may be nearer an occlusal surface 136 of tooth 106A than a gingival margin 128 at tooth 106A. Gingival portions 110 and 116, at labial side 112 and lingual side 118 of shell 108D may flex to allow tooth 106A to enter shell 108D. In some examples, gingival ridge 102A may flex to allow tooth 106A to enter shell 108D. After tooth 106A is received in shell 108D, gingival ridge 102A may urge labial side 112 and lingual side 118 of shell 108D toward labial face 122 and lingual face 120 of tooth 106A below height of contour 121 of tooth 106A. In this way, gingival ridges 102 enhance engagement of removable dental appliance 100 below the height of contour.

In some examples, enhancing engagement of removable dental appliance 100 below the height of contour, e.g., by engaging a lingual surface and/or a labial surface of a respective tooth of teeth 106, may urge an occlusal portion of the interior surface of a respective shell of shells 108 toward an occlusal surface of the respective tooth. For example, gingival ridge 102A may urge labial side 112 and lingual side 118 of shell 108D toward labial face 122 and lingual face 120 of tooth 106B below height of contour 121 of tooth 106B, thereby urging an occlusal portion of surface 132 toward occlusal surface 136 of tooth 106B. Urging an occlusal portion of surface 132 toward occlusal surface 136 of tooth 106B may enable at least a portion of surface 132 to engage with occlusal surface 136 of tooth 106. In some examples, the enhanced engagement below the height of contour of a respective tooth of teeth 106 and the enhanced engagement with a respective occlusal surface of the respective tooth of teeth 106 may enable removable dental appliance 100 to form a force couple on the respective tooth. In some examples, the enhanced engagement below the height of contour of a respective tooth of teeth 106 and the enhanced engagement with a respective occlusal surface of the respective tooth of teeth 106 may improve determinability of the contact points between appliance body 104 and teeth 106. For example, by concentrating engagement at or near the occlusal portions and gingival portions of teeth 106. In this way, gingival ridges 102 may improve engagement of removable dental appliance 100 with teeth 106 to cause movements of teeth 106 without attachments.

In some examples, gingival ridges 102 may be biased into the interproximal spaces and/or lingual or labial faces of teeth 106 to improve engagement with the gingival portion of teeth 106. For example, gingival ridges 102 may be biased outward (e.g., in a direction toward an exterior surface of appliance body 104) near an occlusal portion of appliance body 104 and along the height of shells 108, biased inward (e.g., in a direction toward an interior surface of appliance body 104) near a gingival portion of appliance body 104, or both. In some examples, a first portion of gingival ridges 102 may be biased inward and a second different portion of gingival ridges 102 may be biased outward. Biasing gingival ridges 102 in this way may further enhance engagement of appliance body 104 with the gingival portion of teeth 106, the occlusal portion of teeth 106, or both to enable a greater moment to teeth 106 compared to an appliance body 104 without biased gingival ridges 102. For example, biasing gingival ridges 102 inward near a gingival margin of tooth 106 may reduce premature contact of appliance body 104 with the facial or lingual surfaces of teeth 106 by assuring that first contact occurs near the gingiva. Controlling contact in this way may be helpful when torqueing a tooth 106, e.g., if neighboring teeth are prescribed first-order rotations that cause appliance body 104 deform away from tooth 106 along the gingival margin.

The direction of the force on a respective tooth of teeth 106 may result in part from one or more contact points of at least one surface of a respective shell of shells 108 with at least one surface of the respective tooth of teeth 106 and the position and shape of gingival ridges 102 relative to shells 108. In some examples, the number of contact points, the total area of engagement, or both, of the respective shell of shells 108 with the respective tooth of teeth 106 may be greater than the number of contact points, the total area of engagement, or both of a removable dental appliance without gingival ridges. By increasing the number and/or control of contact points, the direction(s) and magnitude(s) of the force(s) to applied to teeth 106 may be more accurately controlled compared to an alignment tray without gingival ridges 102.

For example, a force distributed substantially evenly across the facial surface of tooth 106A may cause a translation of tooth 106A in the lingual direction. Hence, to achieve a translation of tooth 106A, gingival ridge 102A may be positioned to shell 108D and shaped to distribute force substantially evenly across the facial surface of tooth 106A. A force concentrated on a mesial half of a facial surface of tooth 106A, or one half of a facial surface and the opposite half of the lingual surface of tooth 106A, may cause a rotation of tooth 106A in the lingual direction about an axis of rotation extending generally in the occlusal-gingival direction. Hence, to achieve a rotation of tooth 106A, gingival ridge 102A may be biased toward tooth 106A along a selected portion of shell 108D to cause a rotation of tooth 106A, e.g., to distribute force on one half of a facial surface of tooth 106A or one half of the facial surface and the opposite half of the lingual surface of tooth 106A. A force concentrated near a lingual-gingival margin and/or labial-gingival margin (or at least gingival to the height of contour) of tooth 106A may cause an extrusion of tooth 106A. Hence, to achieve an extrusion, gingival ridges 102A and 102B may be positioned on shell 108D and shaped to concentrate force gingival to the height of contour of tooth 106A, e.g., such that shell 108D is configured to pinch or clamp both the lingual and facial sides of tooth 106A. A force concentrated on a portion of both the facial and occlusal surfaces of a tooth may cause a crown tipping of the tooth in the lingual-gingival direction. A combination of a force concentrated at a facial-occlusal surface of a tooth and a force concentrated at a lingual-gingival surface of a tooth may cause a torqueing of the tooth with the crown moving in the lingual direction and the root moving in the facial direction.

As discussed above, a respective shell of shells 108 may include a surface that defines a void internal to the respective shell, the surface shaped to receive respective tooth in a desired position. Appliance body 104 may be configured to apply a respective force vector at a respective contact point on the respective tooth relative to the void to cause movement of the respective tooth toward the void. For example, as illustrated in FIG. 1D, shell 108D includes an interior surface 132 that defines a void 134 internal to shell 108D. Surface 132 is shaped to receive tooth 106A in a desired position of tooth 106A. In some examples, appliance body 104 may be configured to apply a force vector at contact point 123 on tooth 106A opposite from a portion 133 of void 134 to cause movement of tooth 106A toward portion 133 of void 134. In some examples, surface 132 of shell 108D may define a second portion 135 of void 134, and appliance body 104 may be configured to apply a second force vector at a second contact point 125 on tooth 106A opposite from second portion 135 of void 134 to cause movement of tooth 106A toward second portion 135 of void 134. In some examples, contact points 123 and 125 may be on opposite sides of tooth 106A. In some examples, contact points 123 and 125 may be on the same side of tooth 106A. In some examples, contact point 123 may be located on an occlusal surface of tooth 106A and contact point 125 may be located on a gingival surface of the tooth. In some examples, contact point 123 may be located on lingual surface 120 of tooth 106A and contact point 125 may be located on a labial surface 122 of the tooth. In some examples, appliance body 104 may be configured to apply more than two force vectors at more than two contact points on a respective tooth to cause movement of the respective tooth toward one or more voids. The shape of a void may cause a specific movement of a respective tooth by providing areas of reduced resistance through which a respective tooth of teeth 106 may move in response to force vectors applied to the respective tooth when a removable dental appliance 100 is worn by the patient. In this way, voids internal to appliance body 104 may assist in urging a respective tooth of teeth 106 toward a desired position.

Other force vectors and combinations of force vectors that may result in one or more tooth movements are contemplated. For example, Table 1 includes type of desired tooth movements, respective thresholds for the respective movements, and example locations of gingival ridges relative to the moving tooth to achieve the respective movement. By selecting a shape of gingival ridges 102 and locations of gingival ridges 102 on shells 108, removable dental appliance 100 may be configured to apply, via deformation of gingival ridges 102, a force with a particular direction and magnitude to teeth 106 that may result in any one or more of a corresponding rotational, translational, extrusive, intrusive, tipping, or torqueing force to teeth 106.

TABLE 1

| Tooth Movement | Threshold | Gingival Ridge Locations |
| --- | --- | --- |
| Mesial Root Displacement | 3° | Labial and lingual of moving tooth |
| Distal Root Displacement | 3° | Labial and lingual of moving tooth |
| Lingual Root Displacement | 3° | Labial and lingual of moving tooth |
| Labial Root Displacement | 3° | Labial and lingual of moving tooth |
| Cuspid or Bicuspid Rotation | 5° | Labial and lingual of moving tooth |
| Tooth Extrusion | 0.5 mm | Labial and lingual of moving tooth |
| Multiple Anterior Incisor Extrusion | 0.5 mm | Mesial and distal interproximals of upper incisors |
| Holding Teeth Upright During Space Closure | 0.75 mm | Mesial and distal interproximals of moving tooth |

TABLE 1-continued

| Tooth Movement | Threshold | Gingival Ridge Locations |
|---|---|---|
| Bicuspid Extrusion During Deep Bite Opening | 0.25 mm | Mesial and distal interproximals of bicuspids |
| Expansion | 0.5 mm | Mesial and distal interproximals of bicuspids and/or molars |
| Anchorage | Tooth is designated as anchorage unit | Mesial and distal interproximals of teeth included in anchorage unit |

In some examples, the respective thresholds for the respective movements tooth movements indicate a threshold (minimum) amount of tooth movement above which gingival ridges 102 may be used to ensure that movement of teeth 106 is completed predictably. By selecting a shape of gingival ridges 102 and locations of gingival ridges 102 on shells 108, removable dental appliance 100 may be configured to apply, via deformation of gingival ridges 102, a force with a particular direction and magnitude to teeth 106 that may result in any one or more of a corresponding rotational, translational, extrusive, intrusive, tipping, or torqueing force to teeth 106.

A respective gingival ridge of gingival ridges 102 may extend over at least a portion of one or more adjacent interproximal regions, e.g., interproximal regions 114A and 114B. Gingival ridges 102, e.g., gingival ridge 102B, may include any suitable shape. In some examples, gingival ridges 102 may include a substantially smooth and continuous arcuate shape following the gingival portion (e.g., gingival portion 110 or 116) of appliance body 104 in the mesial-distal direction. A substantially smooth and continuous arcuate shape may result in a substantially uniform (e.g., uniform or near uniform) stiffness characteristic of gingival ridges 102. In some examples, gingival ridges 102 may include a serpentine shape or a zigzag shape extending along the gingival portion of appliance body 104 having two or more linear segments joined at an angle. Forming gingival ridges 102 with curving shapes, e.g., serpentine or zigzag shapes, may result in more controllable and appropriate engaged force levels and directions during tooth treatment intervals.

Figure 1G:
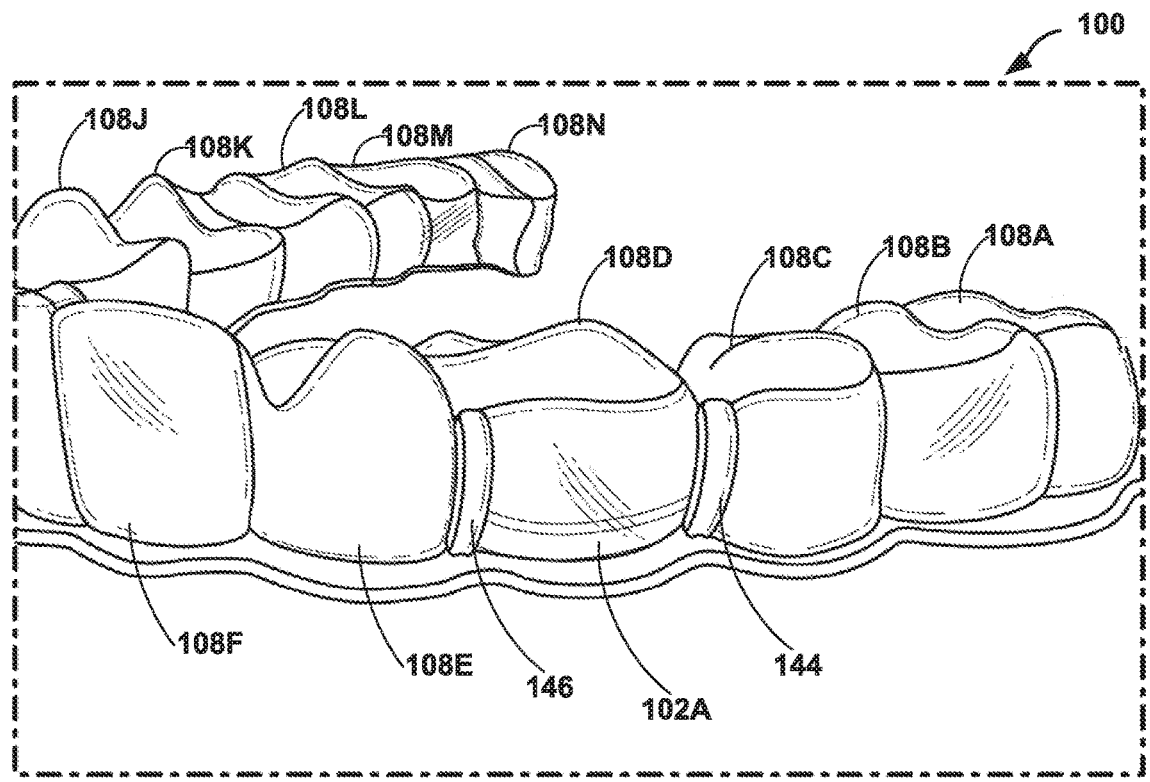
Figure 1H:
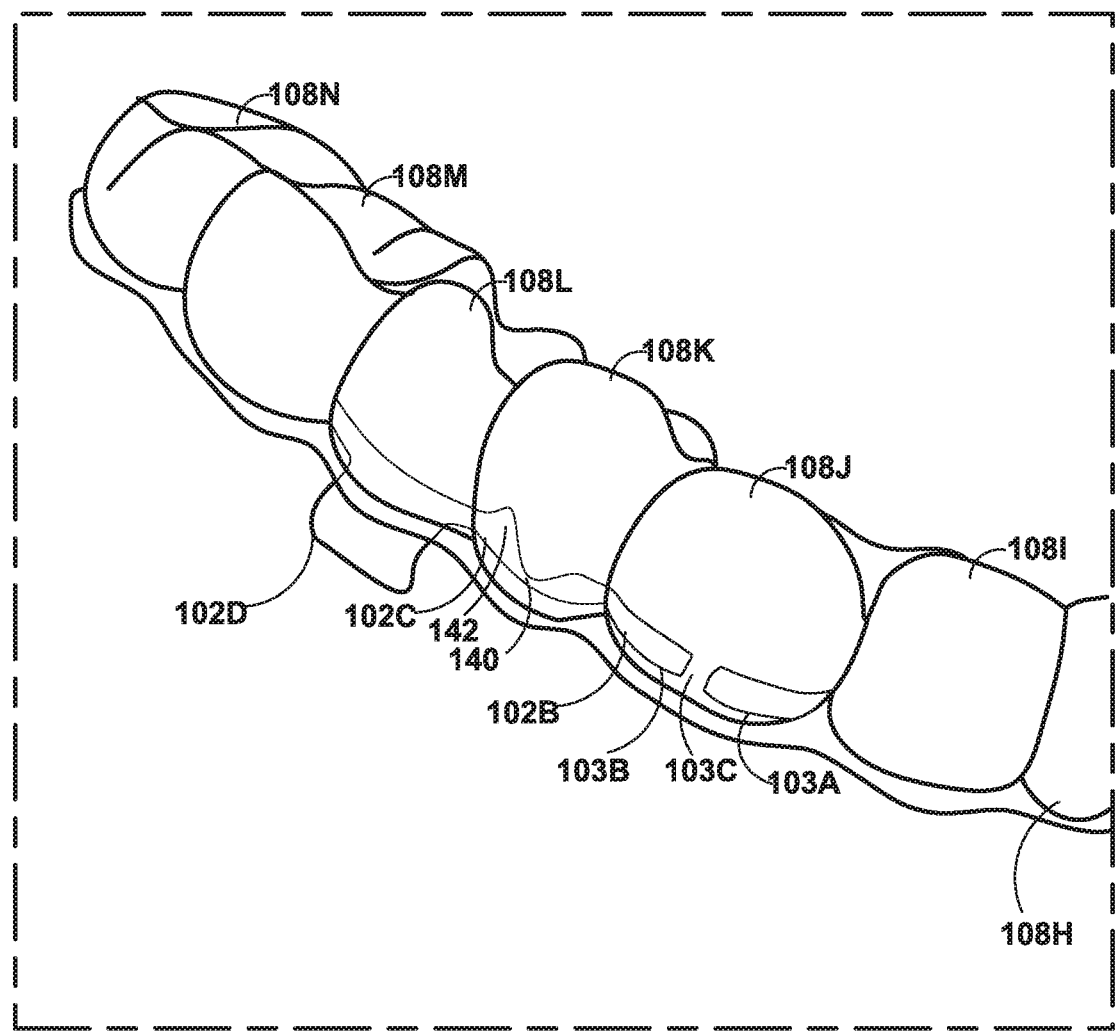

The cross-sectional shape of gingival ridges 102 may be substantially constant or vary along the length of gingival ridges 102. The cross-sectional shape may include, for example, an elliptical shape, a rectangular shape, other geometrical shapes, or irregular shapes. In some examples, the cross-section of a respective gingival ridge of gingival ridges 102 may be configured to control deformation of the respective gingival ridge and, thereby, a magnitude and a direction of a force vector applied to a respective tooth of teeth 106 when removable dental appliance 100 is worn by the patient. For example, as illustrated in FIG. 1H, gingival ridge 102C may include a first region 140 having a relatively smaller cross-sectional area to increase the flexibility of the respective gingival ridge near the region. Additionally, or alternatively, first region 140 may include other features to increase the flexibility of first region 140, such as a relatively flatter cross-section, cut-outs, areas of a material having a low elastic modulus, or the like. The relative flexibility of the respective gingival ridge near first region 140 may reduce the restorative force exerted by gingival ridge 102C when removable dental appliance 100 is worn by the patient.

Similarly, gingival ridge 102C may include a second region 142 having a relatively larger cross-sectional area to increase the stiffness of the respective gingival ridge near first region 140. Additionally, or alternatively, second region 142 may include other features to increase the stiffness of second region 142, such as a reinforcing rib or rail areas of a material having a higher elastic modulus, or the like. For example, as illustrated in FIG. 1G, appliance body 104 may define reinforcing rib 144 distal to gingival ridge 102A and reinforcing rib 146 mesial to gingival ridge 102A. Reinforcing ribs 144 and 146 may be positioned on an exterior surface of appliance body 104 at or near the interproximal regions between shell 108D and adjacent shells 108C and 108E. Although illustrated as near an interproximal region, in some examples, reinforcing ribs 144 and 146 may be positioned in a medial portion of shell 108D. Reinforcing ribs 144 and 146 may enhance the relative stiffness of gingival ridge 102A (or shell 108D) to increase the restorative force exerted by gingival ridge 102A (or shell 108D) when removable dental appliance 100 is worn by the patient. In some examples, reinforcing ribs 144 and 146 may counteract typical material creep and/or diminishing forces applied by removable dental appliance 100 over time. In this way, selecting the shape of gingival ridges 102 may control deformation of the respective gingival ridge and, thereby, a magnitude and a direction of a force vector applied to a respective tooth of teeth 106 when removable dental appliance 100 is worn by the patient.

The length of gingival ridges 102 in the distal-mesial direction may include any suitable length. In some examples, the length of gingival ridges 102 may affect the amount that gingival ridges 102 deform and the resulting force on teeth 106. For example, a longer gingival ridge may result in greater restorative force in gingival ridges 102, a longer distance of expression of the force in gingival ridges 102, or both, compared to shorter gingival ridges 102. In this way, the length of a respective gingival ridge of gingival ridges 102 may affect the force resulting from the deformation of the respective gingival ridge of gingival ridges 102 when removable dental appliance 100 is worn by the patient.

In some examples, as illustrated in FIG. 1H, gingival ridge 102D may protrude over a portion of a lingual gingival margin, a portion of a labial gingival margin, or both. By protruding over a portion of the gingival margin, gingival ridge 102D may be configured to anchor to at least a portion of the alveolar bone via the gingiva. For example, when worn by the patient, gingival ridge 102D may at least partially contact the gingiva overlying the alveolar process to result in at least a portion of the deformation of gingival ridge 102D. In this way, removable dental appliance 100 may be configured to utilize the alveolar process as an anchor. For example, including one or more gingival ridges 102 attached to one or more respective portions of shells 108 extending to contact the gingiva may access additional bracing provided by the extended surface indirectly engaging with the alveolar process without impeding mobility of teeth 106, enable greater force to be applied to a selected tooth of teeth 106 while using the more rigid alveolar process as an anchor instead of neighboring teeth 106, or both. As such, another advantage could be better control of tooth movements relative to a fixed reference (the alveolar process), without causing unwanted reactionary movements of neighboring teeth 106.

Gingival ridges 102 may include any suitable material. In some examples, a respective gingival ridge of gingival ridges 102 may include a continuous or discontinuous region of one or more materials disposed on or integrally formed with appliance body 104. In some examples, gingival ridges 102 and appliance body 104 may be formed from a unitary material. Gingival ridges 102 may be formed of a material of a relatively higher modulus of elasticity compared to appliance body 104. Forming gingival ridges 102 from a material of a higher modulus of elasticity may stiffen the gingival edge of appliance body 104 relative to adjacent portions of appliance body 104, increase the durability of removable dental appliance 100, and/or improve control of direction of the force applied to shells 108. In some examples, a respective gingival ridge of gingival ridges 102 may include metal wire including, but not limited to, iron, copper, tin, nickel, titanium, molybdenum, tungsten, and alloys thereof, such as stainless steel (SS), nickel-titanium (NiTi or Nitinol), copper-nickel-titanium (CuNiTi), cobalt-chromium (CoCr), cobalt-chromium-molybdenum (Co-CrMo or CCM®), or cobalt-chromium-tungsten (CoCrW). Metal wire includes braided and non-braided wires and wires having any suitable cross-sectional shape, such as elliptical or rectangular. In some examples, a respective gingival ridge of gingival ridges 102 may include a polymeric rib including, but not limited to, polylactic acid; epoxy; silicones; polyesters; polyurethanes; polycarbonate; thiol-ene polymers; acrylate polymers such as urethane, (meth)acrylate polymers or poly(methyl methacrylate), polyalkylene oxide di(meth)acrylate, alkane diol di(meth) acrylate, aliphatic (meth)acrylates, silicone (meth)acrylate; polyethylene terephthalate based polymers such as polyethylene terephthalate glycol; polypropylene; ethylene-vinyl acetate; nylon; acetal resin (POM or Delrin®); acrylonitrile butadiene styrene; or combinations thereof. In some examples, the polymeric rib may include polymers configured to be dispensed using fused deposition modeling (FDM) printing processes, such as, polymers suitable for robotically dispensing a bead or beads of the polymer onto the surface of a removable dental appliance using a heated extruder nozzle. Using FDM printing may allow for controlling thickness in select areas of the removable dental appliance, e.g., the gingival ridges 102, or controlling material properties compared to the bulk material of the removable dental appliance. In examples, in which the polymeric rib material and the removable dental appliance material both include thermoplastics, FDM printed material may fuse to the removable dental appliance material.

Gingival ridges 102 may be attached to appliance body 104 using any suitable attachment means. A respective gingival ridge of gingival ridges 102 and/or appliance body 104 may be shaped to form a stepwise joint or a tapered joint when the respective gingival ridge is attached to appliance body 104. In some examples, gingival ridges 102 may be integrally formed with appliance body 104. For example, removable dental appliance 100 may include a unitary polymer including appliance body 104 and gingival ridges 102. In some examples, gingival ridges 102 may be physically separate from and mechanically attached to appliance body 104 along one or more portions of gingival ridges 102. In some examples, a respective gingival ridge of gingival ridges 102 may be adhered to appliance body 104 along the entire length of the respective gingival ridge, a portion of the respective gingival ridge, or two or more discontinuous portions of the respective gingival ridge. A suitable adhesive may include, for example, epoxy resins, polyurethanes, cyanoacrylates, acrylics, silicones, or the like. In some examples, a respective gingival ridge or gingival ridges 102 may be at least partially surrounded by two or more material layers forming appliance body 104. For example, gingival ridges 102 may be formed or positioned on a first material layer of appliance body 104 and a second material layer of appliance body 104 may be formed or placed over the first material layer and the gingival ridges 102.

In some examples, appliance body 104 may define one or more alignment guides configured to mechanically attach a respective gingival ridge of gingival ridges 102 to appliance body 104. For example, an alignment guide may be integrally formed with appliance body 104 along a gingival edge of appliance body 104. The alignment guide may be configured to receive a respective gingival ridge of gingival ridges 102 (e.g., gingival ridge 102A). For example, the alignment guide may be shaped to engage a respective gingival ridge of gingival ridges 102 in a push-to-fit or push-to-connect arrangement. As one example, the alignment guide may include a recess shaped to receive the shape of a respective gingival ridge of gingival ridges 102 and one or more ridges or posts integrally formed with appliance body 104. The appliance body 104, such as the one or more ridges or posts, may deform when the respective gingival ridge of gingival ridges 102 is inserted (e.g., pushed) into the recess to allow the respective gingival ridge to seat in the recess. The one or more ridges or posts may then return to an undeformed configuration to retain the respective gingival ridge in the recess. In some examples, a combination of mechanical attachments may be used to attach gingival ridges 102 to appliance body 104. In some examples, a first portion of a respective gingival ridge of gingival ridges 102 may be fixed to appliance body 104 and a second portion of the respective gingival ridge may be secured, but free to travel in a selected direction, e.g., such as secured in an elongate recess and allowed to travel along the longitudinal axis of the elongate recess. By fixing selected portions of gingival ridges 102 to appliance body 104 while other portions of gingival ridges 102 may travel in a selected direction, removable dental appliance 100 may control the location or locations where a restorative force on gingival ridges 102 is transferred to appliance body 104. For example, in examples in which gingival ridges 102 are fixed to appliance body 104 near interproximal regions, the restorative force from the deformation of gingival ridges 102 may be substantially transferred to a contact point near the respective interproximal regions. Force transfer via engagement near the interproximal regions may enable or improve desired tooth movements such as rotations, torqueing, tipping, or extrusions. In this way, selecting the type and location of attachment of gingival ridges 102 or appliance body 104 may affect a magnitude and/or a force vector applied to teeth 106 when removable dental appliance 100 is worn by the patient.

By selecting the material, shape, length, and attachment of a respective gingival ridge of gingival ridges 102, removable dental appliance 100 may control at least one of a direction, a magnitude, and a length of expression of a force on a respective shell of shells 108 resulting from deformation of appliance body 104 when removable dental appliance 100 is worn by the patient.

In some examples, appliance body 104 may be formed from a unitary material, e.g., a single, uniform material. The unitary material may include a single polymer, or substantially homogeneous mixture of one or more polymers. For example, removable dental appliance 100 may consist of a single, continuous 3D printed or thermoformed component. In other examples, appliance body 104 may include a multi-layer material. The multi-layer material may include multiple layers of a single material, e.g., a single polymer, or multiple layers of a plurality of materials, e.g., two or more polymers, a polymer and another material. Multi-layer materials may enable one or more portions of appliance body 104 to be formed with a plurality of layers having different elastic modulus to enable selection of force characteristics, displacement characteristics, or both of gingival ridges 102. For example, removable dental appliance 100 may consist of a multilayer 3D printed or thermoformed component. Suitable polymers may include, but are not limited to, (meth) acrylate polymer; epoxy; silicones; polyesters; polyurethanes; polycarbonate; thiol-ene polymers; acrylate polymers such as urethane (meth)acrylate polymers, polyalkylene oxide di(meth)acrylate, alkane diol di(meth)acrylate, aliphatic (meth)acrylates, silicone (meth)acrylate; polyethylene terephthalate based polymers such as polyethylene terephthalate glycol (PETG); polypropylene; ethylene-vinyl acetate; or combinations thereof. In the same or different examples, removable dental appliance 100 may include chamfers or fillets on edges of appliance body 104 and other spaces. Such chamfers or fillets may improve patient comfort and reduce the visibility of removable dental appliance 100.

In other examples, removable dental appliance 100 may include metallic components configured to enhance forces applied by removable dental appliance 100 to one or more of the surrounded teeth 106. For example, the metallic component may comprise a wire or ribbon extending through at least a portion of appliance body 104, such as gingival ridges 102. In some examples, removable dental appliance 100 may include one or more other metal components, such as metal occlusal components, where greater durability is needed to overcome the stress of high-pressure occlusal contact, such as bruxing, or mastication. In some examples, removable dental appliance 100 may include catches configured to engage an anchorage device implanted within the patient, e.g., a temporary anchorage device or mini-screw, or attachments fixed to a surface a of tooth of teeth 106. For example, catches may be positioned on anchor shells 108A-104D and 104K-104N to connect to an anchorage device on anchor teeth, such as molars or premolars. In this manner, such removable dental appliances 100 may provide a hybrid construction of metal and plastic.

In some examples, a metallic component may be formed on removable dental appliance 100 using an electroforming (or electrodeposition) process. For example, an electrically conductive coating may be applied to selected areas of removable dental appliance 100, such as by electroless plating, physical vapor deposition (e.g. electron beam physical vapor deposition, evaporative deposition, sputter deposition, etc.), or conductive paint. The selected areas may be masked prior to deposition of the conductive coating to ensure that only the selected areas are made conductive. After applying the conductive coating, one or more contact points on the conductive coating may be connected to a first terminal of a power source, e.g., a negative terminal of a DC voltage source, and piece of donor metal may be connected to a second terminal of the power source, e.g., a positive terminal of the DC voltage source. Then removable dental appliance may be immersed in an electrolyte solution, such as water, salt water, or acid. Current applied to the terminals may result in migration of metal ions through the solution from the donor metal to the conductive surface of the appliance where they are deposited. The duration of electroplating may be controlled to control the thickness of the metal coating. In some examples, masking may include placing a non-conductive vertical dam on either side of the conductive area to control a shape of the deposited metal, e.g., to make sidewalls of the deposited metal perpendicular to the substrate surface. In some examples, the dam might may serve to brace the metal reinforcement and retain it in its proper position while under stress, minimizing the possibility of detachment. In some examples, the dam may include a fillet between the vertical wall of the metal reinforcement and the horizontal surface of the substrate to relieve mechanical stress at the joint and/or increase patient comfort. In some examples, a metal with suitable structural properties and ease of electroforming, such as nickel, may be used for the bulk of the deposited metal. To improve biocompatibility (e.g., lessen the possibility of allergic reaction or corrosion) the bulk metal may be coated with one or more inert metals, such as gold, platinum, or rhodium; a metal oxide; or a polymer. Additionally, or alternatively, the entire outer surface of the removable dental appliance may be coated with another layer of polymer or thermoformed polymeric sheet.

While plastic components may be generally clear for reduced visibility, metal components may include plating or other coloring to reduce visibility of removable dental appliance 100 when worn by the patient. For example, metal components positioned near teeth 106 of a patient when worn may include white colored coating or plating, such as, for example, rhodium, silver, white anodized titanium, Teflon, PTFE, and the like, or be formed of a white colored metal, such as, for example, rhodium, silver, white anodized titanium, and the like. Metal components positioned elsewhere may be colored to generally match tissue color within the mouth of the patient.

Figure 2:
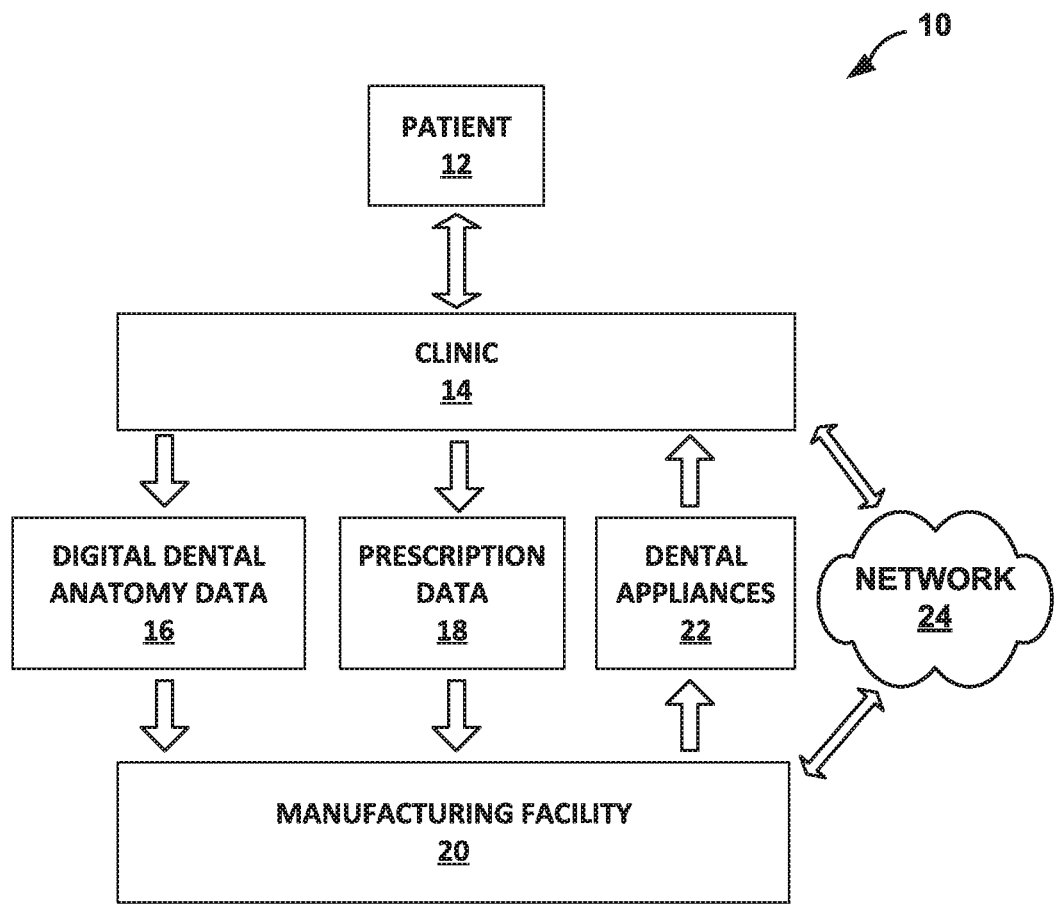
FIG. 2 is a block diagram illustrating an example computer environment in which a clinic and manufacturing facility communicate information throughout a dental appliance manufacturing process.

FIG. 2 is a block diagram illustrating an example computer environment 10 in which clinic 14 and manufacturing facility 20 communicate information throughout a manufacturing process of a set of removable dental appliances 22 for patient 12. The set of removable dental appliances 22 may include removable dental appliance 100. As discussed above, removable dental appliance 100 includes shells and at least one gingival ridge. Initially, an orthodontic practitioner of clinic 14 generates one or more images of a dental anatomy of patient 12 using any suitable imaging technique and generates digital dental anatomy data 16 (e.g., a digital representation of patient's 12 tooth structure). For example, the practitioner may generate X RAY images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of three-dimensional (3D) data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.). Alternatively, other intra-oral scanners or intra-oral contact probes may be used. As another option, the digital dental anatomy data 16 may be provided by scanning a negative impression of the teeth of patient 12. As still another option, the digital dental anatomy data 16 may be provided by imaging a positive physical model of the teeth of patient 12 or by using a contact probe on a model of the teeth of patient 12. The model used for scanning may be made, for example, by casting an impression of the dentition of patient 12 from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in, for example, U.S. Pat. No. 9,191,648 (Kriveshko et al.) and U.S. Pat. No. 9,245,374 (McQueston et al.).

In addition to providing digital images by scanning the exposed surfaces of the teeth, it is possible to image non-visible features of the dentition, such as the roots of the teeth of patient 12 and the jaw bones of patient 12. In some embodiments, the digital dental anatomy data 16 is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.). Issued U.S. Pat. No. 7,027,642 (Imgrund, et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures but includes imaging of dental anatomies that are hidden from view. The dental anatomy may include, but is not limited to, any portion of crowns or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

To generate digital dental anatomy data 16, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. For this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation allows a user to characterize and manipulate the teeth arrangement as a set of individual objects. Advantageously, the computer may derive diagnostic information such as arch length, bite setting, interstitial spacing between adjacent teeth, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental anatomy data 16, clinic 14 may store digital dental anatomy data 16 within a patient record in a database. Clinic 14 may, for example, update a local database having a plurality of patient records. Alternatively, clinic 14 may remotely update a central database (optionally within manufacturing facility 20) via network 24. After digital dental anatomy data 16 is stored, clinic 14 electronically communicates digital dental anatomy data 16 to manufacturing facility 20. Alternatively, manufacturing facility 20 may retrieve digital dental anatomy data 16 from the central database. Alternatively, manufacturing facility 20 may retrieve preexisting digital dental anatomy data 16 from a data source unassociated with clinic 14.

Clinic 14 may also forward prescription data 18 conveying general information regarding a practitioner's diagnosis and treatment plan for patient 12 to manufacturing facility 20. In some examples, prescription data 18 may be more specific. For example, digital dental anatomy data 16 may be a digital representation of the dental anatomy of patient 12. The practitioner of clinic 14 may review the digital representation and indicate at least one of desired movements, spacing, or final positions of individual teeth of patient 12. For example, the desired movements, spacing, and final positions of individual teeth of patient 12 may affect the forces to be applied to the teeth of patient 12 at each stage of treatment by each removable dental appliance of the set of removable dental appliances 22. As discussed above, the forces applied by each removable dental appliance 100 of the set of removable dental appliances 22 may be determined by selecting the dimensions, shapes, and positions of the gingival ridge (e.g., gingival ridges 102) and shells (e.g., shells 108). The at least one of desired movements, spacing, or final positions of individual teeth of patient 12 may enable one or more of the practitioner, a technician at manufacturing facility 20, and a computer at manufacturing facility 20 to determine at least one of selected dimensions, shapes, and positions of at least one of the shells, and gingival ridges. In this way, digital dental anatomy data 16 may include at least one of practitioner, technician, or computer selected dimensions, shapes, and positions of at least one of the gingival ridge and the shells of each of removable dental appliance of the set of removable dental appliances 22 to result in the desired movement of the teeth of patient 12. Following review of the digital representation, the digital dental anatomy data 16 that includes the selected dimensions, shapes, and positions of the gingival ridge and shells of each removable dental appliance of the set of removable dental appliances 22, may be forwarded to manufacturing facility 20. Manufacturing facility 20 may be located off-site or located with clinic 14.

For example, each clinic 14 may act as manufacturing facility 20 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental anatomy of patient 12 through additive manufacturing. The 3D printer may use iterative digital designs of original dental anatomy of patient 12 as well as a desired dental anatomy of patient 12 to produce multiple digital appliances and/or digital appliance patterns customized to produce the desired dental anatomy of patient 12. In some examples, other methods of additive manufacturing may include, for example, fused deposition modeling using a 5- or 6-axis cartesian robot or articulating arm robot to dispense material onto the surface of a removable dental appliance after thermoforming, 3D printing, and/or milling the removable dental appliance. Manufacturing may include post-processing, such as milling, to remove uncured resin and remove support structures, or to assemble various components, which may also be necessary and could also be performed in a clinical setting.

Manufacturing facility 20 utilizes digital dental anatomy data 16 of patient 12 to construct the set of removable dental appliances 22 to reposition teeth of patient 12. Sometime thereafter, manufacturing facility 20 forwards the set of removable dental appliances 22 to clinic 14 or, alternatively, directly to patient 12. For example, the set of removable dental appliances 22 may be an ordered set of removable dental appliances. Patient 12 then wears the removable dental appliances 22 in the set of removable dental appliances 22 sequentially over time according to a prescribed schedule to reposition the teeth of patient 12. For example, patient 12 may wear each removable dental appliance in the set of removable dental appliances 22 for a period of between about 1 week and about 6 weeks, such as between about 2 weeks and about 4 weeks, or about 3 weeks. Optionally, patient 12 may return to clinic 14 for periodic monitoring of the progress of the treatment with removable dental appliances 22.

During such periodic monitoring, a clinician may adjust the prescribed schedule of patient 12 for wearing the removable dental appliances in the set of removable dental appliances 22 sequentially over time. Monitoring generally includes visual inspection of the teeth of patient 12 and may also include imaging to generate digital dental anatomy data. In some relatively uncommon circumstances, the clinician may decide to interrupt the treatment of patient 12 with the set of removable dental appliances 22, for example, by sending the newly generated digital dental anatomy data 16 to manufacturing facility 20 in order to produce a new set of removable dental appliances 22. In the same or different examples, the clinician may send newly generated digital dental anatomy data 16 to manufacturing facility 20 following the completion of the prescribed schedule of the treatment with removable dental appliances 22. In addition, following the completion of the prescribed schedule of the treatment with removable dental appliances 22, the clinician may request a new set of removable dental appliances from manufacturing facility 20 to continue treatment of patient 12.

Figure 3:
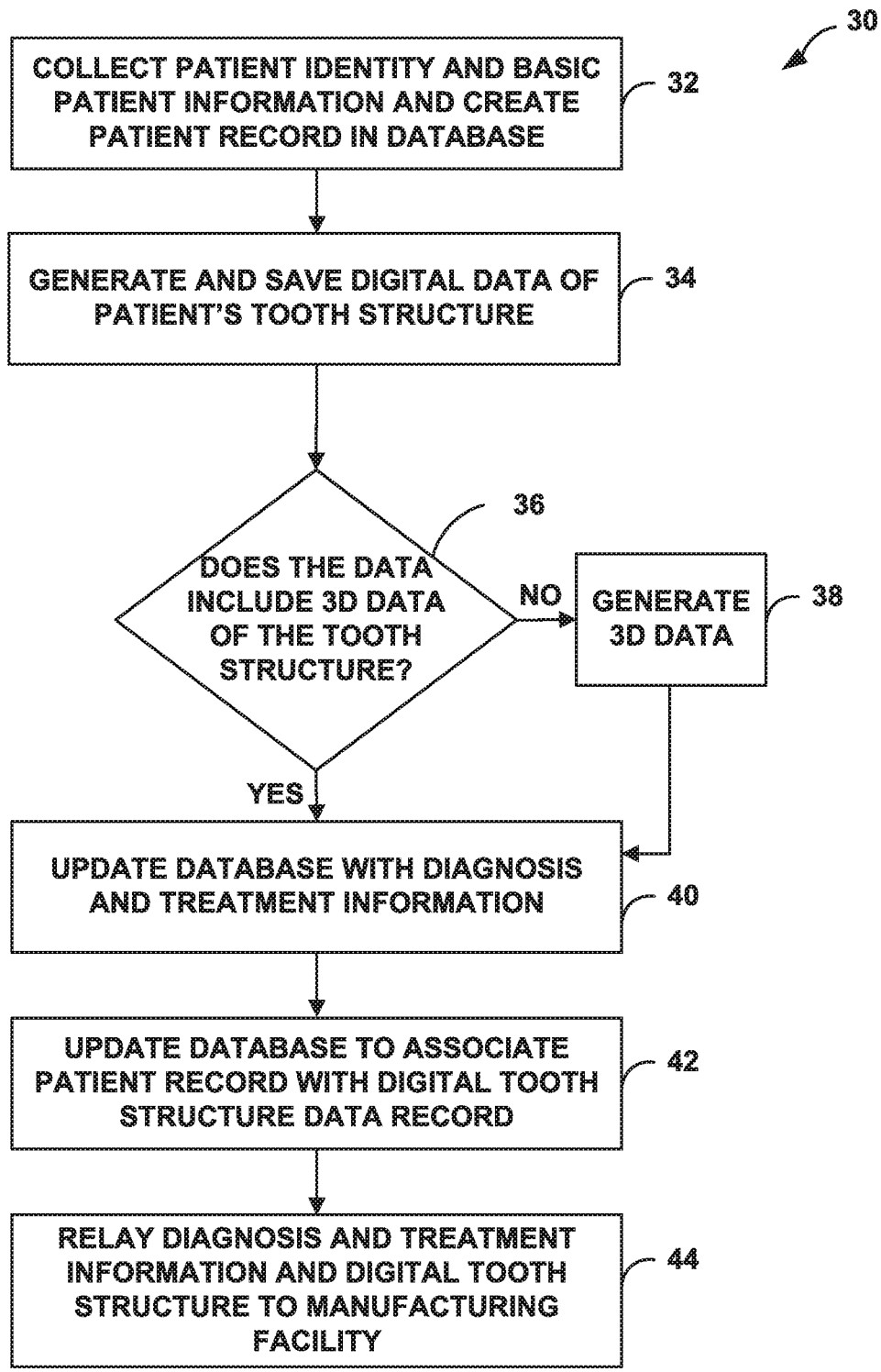
FIG. 3 is a flow diagram illustrating an example process of generating digital dental anatomy data.

FIG. 3 is a flow diagram illustrating an example process of generating digital dental anatomy data 16. Initially, a practitioner at clinic 14 collects patient identity and other information from patient 12 and creates a patient record (32). As described, the patient record may be located within clinic 14 and optionally configured to share data with a database within manufacturing facility 20. Alternatively, the patient record may be located within a database at manufacturing facility 20 that is remotely accessible to clinic 14 via network 24 or within a database that is remotely accessible by both manufacturing facility 20 and clinic 14.

Next, digital dental anatomy data 16 of patient 12 may be generated using any suitable technique (34), to thereby create a virtual dental anatomy. Digital dental anatomy data 16 may be comprised of a two-dimensional (2D) image and/or a three-dimensional (3D) representation of the dental anatomy.

In one example, 3D representations of a dental anatomy are generated using a cone beam computerized tomography (CBCT) scanner, such as an i-CAT 3D dental imaging device (available from Imaging Sciences International, LLC; 1910 N Penn Road, Hatfield, Pa.). Clinic 14 stores the 3D digital dental anatomy data 16 (in the form of radiological images) generated from the CBCT scanner in the database located within clinic 14, or alternatively, within manufacturing facility 20. The computing system processes the digital dental anatomy data 16 from the CBCT scanner, which may be in the form of a plurality of slices, to compute a digital representation of the tooth structure that may be manipulated within the 3D modeling environment.

If 2D radiological images are used (36), then the practitioner may further generate 3D digital data (38). The 3D digital dental anatomy data 16 may be produced by, for example, forming and subsequently digitally scanning a physical impression or casting of the tooth structure of patient 12. For example, a physical impression or casting of a dental arch of patient 12 may be scanned using a visible light scanner, such as an OM-3R scanner (available from Laser Design, Inc. of Minneapolis, Minn.) or an ATOS scanner (available from GOM GmbH of Braunschweig, Germany). Alternatively, the practitioner may generate the 3D digital dental anatomy data 16 of the occlusal service by use of an intra-oral scan of the dental arch of patient 12, or existing 3D tooth data. For example, U.S. Pat. No. 8,491,306, titled, "REGISTERING PHYSICAL AND VIRTUAL TOOTH STRUCTURES WITH PEDESTALS," issued on Jul. 23, 2013, describes a method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, which is incorporated herein by reference in its entirety, may be used. Additionally, or alternatively, U.S. Pat. No. 8,897,902, titled "ORTHODONTIC DIGITAL SETUPS," issued on Nov. 25, 2014, describes techniques for defining a virtual tooth surface and virtual tooth coordinate system as described in U.S. Patent Application Publication No. 2013/0325431, titled ORTHODONTIC DIGITAL SETUPS," and published on Dec. 5, 2013 may be used, which is incorporated herein by reference in its entirety. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the tooth structure of patient 12 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low-resolution image of the roots obtained from a CBCT scanner (e.g., an i-CAT 3D dental imaging device) and the second 3D digital representation may be a relatively high-resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software (available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the tooth structure, including the occlusal surface as well as the root structure of the patient's dental arch. Modeling software provides a user interface that allows the practitioner to manipulate digital representations of the teeth in 3D space relative to the digital representation of the dental arch of patient 12. By interacting with the computer system, the practitioner generates treatment information, such as by selecting indications of the final positions of individual teeth of patient 12, duration of a respective stage of treatment, or number of treatment stages, the direction or magnitude of forces on the teeth of patient 12 during a stage of treatment, or the like (40). For example, the final positions of individual teeth of patient 12, duration of a respective stage of treatment, or number of treatment stages may affect the direction or magnitude of forces on the teeth of patient 12 at each stage of treatment by each removable dental appliance of the set of removable dental appliances 22. In some examples, gingival ridge may be used during at least one, but fewer than all stages of treatment. As discussed above, the forces applied by each removable dental appliance 100 of the set of removable dental appliances 22 may be determined by selecting the dimensions, shapes, and positions of the gingival ridge (e.g., gingival ridges 102) and shells (e.g., shells 108). In this way, updating the database with diagnostic and treatment information (40) may include determining or selecting by the practitioner, a technician, or automatically by a computer the dimensions, shapes, and positions of the gingival ridge and shells of each of removable dental appliance of the set of removable dental appliances 22 to result in the desired movement of the teeth of patient 12.

Once the practitioner has finished conveying general information regarding a diagnosis and treatment plan within the 3D environment, the computer system updates the database associated with the patient record to record the prescription data 18 conveying general information regarding a diagnosis and treatment plan as specified by the practitioner (42). Thereafter, the prescription data 18 is relayed to manufacturing facility 20 for manufacturing facility 20 to construct one or more removable dental appliances including gingival ridges, such as removable dental appliances 22 (44).

Although described with respect to an orthodontic practitioner located at an orthodontic clinic, one or more of the steps discussed with respect to FIG. 3 may be performed by a remote user, such as a user located at manufacturing facility 20. For example, the orthodontic practitioner may only send radiological image data and an impression or casting of the patient to manufacturing facility 20, where a user interacts with a computer system to develop a treatment plan within a 3D modeling environment. Optionally, a digital representation of the treatment plan within the 3D modeling environment may then be transmitted to the orthodontic practitioner of clinic 14, who may review the treatment plan and either send back his or her approval or indicate desired changes.

Figure 4:
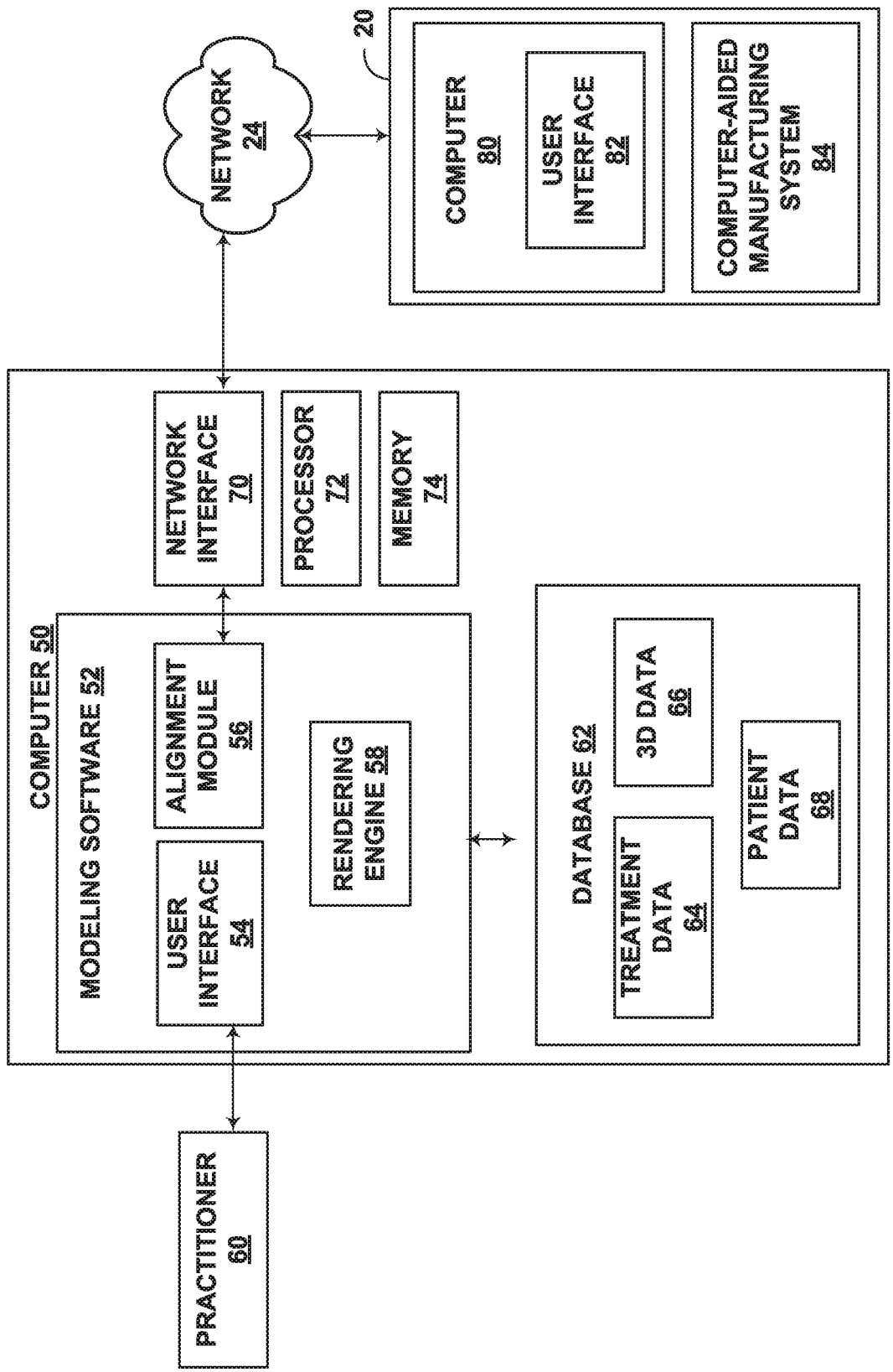
FIG. 4 is a block diagram illustrating an example of a client computing device connected to a manufacturing facility via a network to generate digital dental anatomy data.

FIG. 4 is a block diagram illustrating an example of a client computing device 50 connected to manufacturing facility 20 via network 24 to generate digital dental anatomy data. In the illustrated example, client computing device 50 provides an operating environment for modeling software 52. Modeling software 52 presents a modeling environment for modeling and depicting the 3D representation of the teeth of patient 12. In the illustrated example, modeling software 52 includes user interface 54, alignment module 56, and rendering engine 58.

User interface 54 provides a graphical user interface (GUI) that visually displays the 3D representation of the teeth of patient 12. In addition, user interface 54 provides an interface for receiving input from practitioner 60, e.g., via a keyboard and a pointing device, a touchscreen, or the like, for manipulating the teeth of patient 12 within the modeled dental arch.

Modeling software 52 may be accessible to manufacturing facility 20 via network interface 70. Modeling software 52 interacts with database 62 to access a variety of data, such as treatment data 64, 3D data 66 relating to the tooth structure of patient 12, and patient data 68. Database 62 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computing device 50, database 62 may be located remote from the client computing device 50 and coupled to the client computing device 50 via a public or private network, e.g., network 24.

Treatment data 64 describes diagnosis or repositioning information for the teeth of patient 12 selected by practitioner 60 and positioned within the 3D modeling environment. For example, treatment data 64 may include the dimensions, shapes, and positions of the gingival ridge (e.g., gingival ridges 102) and shells (e.g., shells 108) that may result in a selected magnitude and direction of force vectors to be applied to patient's teeth (e.g., teeth 106) throughout the treatment plans.

Patient data 68 describes a set of one or more patients, e.g., patient 12, associated with practitioner 60. For example, patient data 68 specifies general information, such as a name, birth date, and a dental history, for each patient 12.

Rendering engine 58 accesses and renders 3D data 66 to generate the 3D view presented to practitioner 60 by user interface 54. More specifically, 3D data 66 includes information defining the 3D objects that represent each tooth (optionally including roots), and jaw bone within the 3D environment. Rendering engine 58 processes each object to render a 3D triangular mesh based on viewing perspective of practitioner 60 within the 3D environment. User interface 54 displays the rendered 3D triangular mesh to practitioner 60 and allows practitioner 60 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describes other examples for computer systems and 3D modeling software having user interfaces that may be used with the techniques described herein, each of which are incorporated by reference in their entireties.

Client computing device 50 includes processor 72 and memory 74 to store and execute modeling software 52. Memory 74 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 72 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 74 may store program instructions (e.g., software instructions) that are executed by processor 72 to carry out the techniques described herein. In other examples, the techniques may be executed by specifically programmed circuitry of processor 72. In these or other ways, processor 72 may be configured to execute the techniques described herein.

Client computing device 50 is configured to send a digital representation of a 3D tooth structure of a patient, and optionally, treatment data 64 and/or patient data 68 to computer 80 of manufacturing facility 20 via network 24. Computer 80 includes user interface 82. User interface 82 provides a GUI that visually displays the 3D representation of the digital model of teeth. In addition, user interface 82 provides an interface for receiving input from a user, e.g., via a keyboard and a pointing device, for manipulating a patient's teeth within the digital representation of the 3D tooth structure of the patient.

Computer 80 may further be configured to automatically determine dimensions and shapes of each removable dental appliance of a set of removable dental appliances 22. The dimensions and shapes of removable dental appliance 22 may include a position, dimension, and shape of shells and gingival ridges such that removable dental appliance 22 is configured to reposition the one or more teeth from their initial positions to final positions when the removable dental appliance is worn by the patient. As discussed above in reference to FIGS. 1A-1H, the position, dimension, and shape of the shells and gingival ridges may affect the magnitude, direction, and length of expression of a force applied to the teeth when the removable dental appliance is worn by the patient. For example, the shape of a respective gingival ridge of a plurality of gingival ridges may determine, at least in part, the magnitude, direction, and length of expression of the force resulting from a deformation of the respective gingival ridge when the removable dental appliance is worn by the patient. The location of a respective gingival ridge relative to a respective shell may also determine, at least in part, the direction of the force that may be transferred from a respective gingival ridge to a respective shell. Also, the location or locations of engagement of a respective shell with a respective tooth determine the direction of the force applied to the respective tooth. Computer 80 may analyze at least one of the magnitude, direction, and length of expression of the force resulting from a deformation of the respective gingival ridge when the removable dental appliance is worn by the patient to determine at least one of position, dimension, and shape of a respective gingival ridge that will result in a desired movement of the patient's teeth when the removable dental appliance is worn by the patient.

Computer 80 may present a representation of the removable dental appliance 22 for the user to review, including review of dimensions and shapes. Alternatively, or additionally, computer 80 may accept input from a user to determine dimensions and shapes of a set of removable dental appliances 22 for patient 12. For example, the user input may influence at least one of an automatically determined dimensions or shapes. Computer 80 may transmit, or otherwise send, a digital model of the set of removable dental appliance 22, the dimensions and shapes of the set of removable dental appliances 22, or both, to computer-aided manufacturing system 84 for production of the set of removable dental appliances 22.

Client computing device 50 and computer 80 are merely conceptual representations of an example computer system. In some examples, the functionalities described with respect to client computing device 50, computer 80, or both may be combined into a single computing device or distributed among multiple computing devices within a computer system. For example, cloud computing may be used for digital design of dental appliances described herein. In one example, the digital representations of tooth structures are received at one computer at the clinic, while a different computer, such as computer 80, is used to determine the shapes and dimensions of a removable dental appliance. In addition, it may not be necessary for that different computer, such as computer 80, to receive all of the same data in order for it to determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computing device 50 and computer 80, or otherwise utilized to design a custom dental appliance may be significantly less than the complete data set representing a complete digital dental model of a patient.

Figure 5:
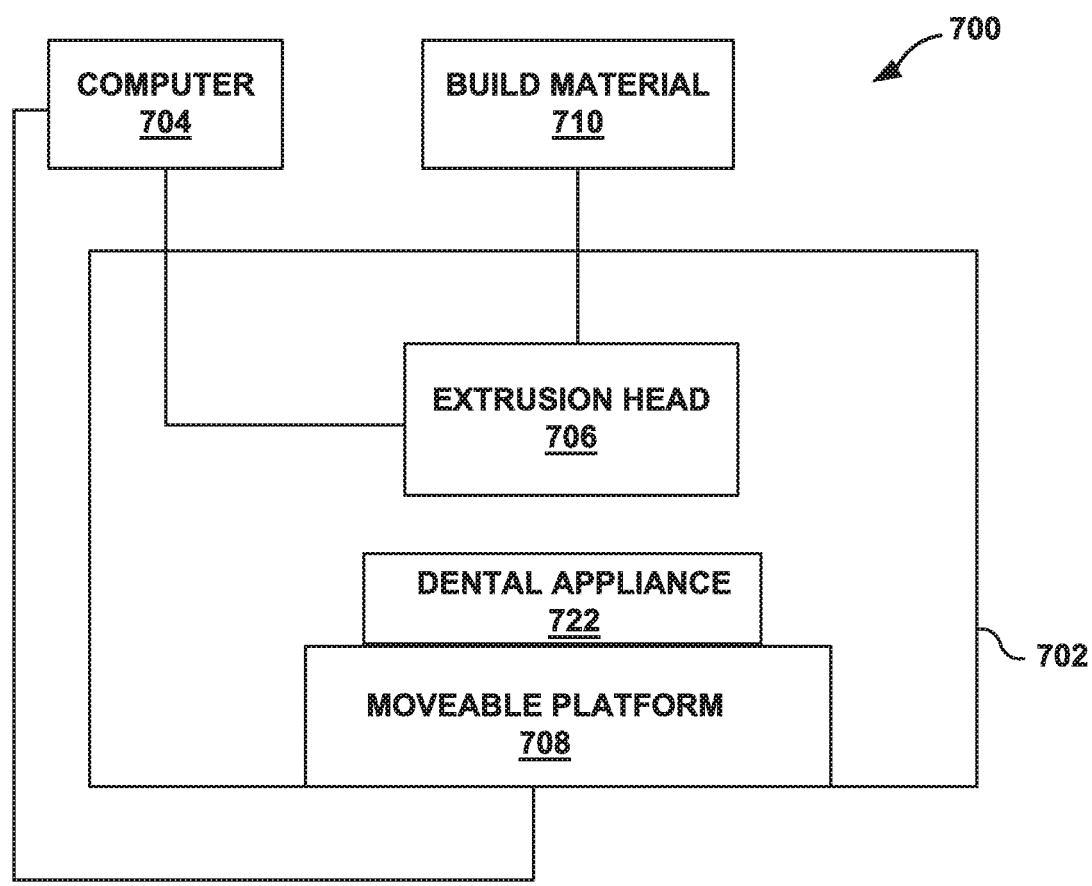
FIG. 5 is a block diagram illustrating an example computer-aided manufacturing system for construction of a removable dental appliance.

FIG. 5 is a block diagram illustrating an example computer-aided manufacturing system 700 for construction of removable dental appliance 722. In some examples, computer-aided manufacturing system 700 may include a 3D printer, a fused deposition modeling device, or the like. Computer-aided manufacturing system 700 may include an additive manufacturing system 702 in communication with computer 704 and coupled to build material source 710. In some examples, computer-aided manufacturing system 700 may include computer-aided manufacturing system 84 of FIG. 4. For example, computer 704 may be the same as or substantially similar to computer 80. Build material source 710 may include a source of at least one polymeric material, such as, for example, at least one of the polymeric materials of appliance body 104 discussed above. Dental appliance 722 may be the same as or substantially similar to removable dental appliance 100. In some examples, dental appliance 722 may include one dental appliance of the set of dental appliances 22.

Additive manufacturing system 702 may include a moveable platform 708 and an extrusion head 706. Movable platform 708 and extrusion head 706 may be configured to manufacture dental appliance 722. For example, computer 704 may control extrusion head 706 and moveable platform 708 to manufacture removable dental appliance 722. Controlling, by computer 704, extrusion head 706 may include at least one of controlling a material feed rate from build material source 710 to extrusion head 706, controlling a deposition rate of build material on dental appliance 722, controlling a temperature of extrusion head 706, and controlling a position of extrusion head 706. By controlling at least one of a material feed rate, a material deposition rate, a temperature of extrusion head 706, and a position of extrusion head 710, computer 704 may control manufacture of a position, dimension, and shape of at least a portion of dental appliance 722. Controlling, by computer 704, movable platform 708 may include at least one of controlling a translation of moveable platform in a plane normal to the direction of material deposition from extrusion head 706 and controlling an elevation of moveable platform along an axis substantially parallel to the direction of material deposition from extrusion head 706. By controlling at least one of a translation and elevation of moveable platform 708, computer 704 may control manufacture of a position, dimension, and shape of at least a portion of dental appliance 722.

Although FIG. 5 illustrates a computer-aided manufacturing system 700 configured for Fused Deposition Modeling (FDM), computer-aided manufacturing system 700 may also be configured for stereolithography (SLA), inverse vat polymerization additive manufacturing, inkjet/polyjet additive manufacturing, or other methods of additive manufacturing. In examples in which computer-aided manufacturing system 700 is configured for polyjet printing, computer-aided manufacturing system 700 may be configured to print multiple materials in a single print, thereby allowing a high modulus material for the rigid components of dental appliance 722 (e.g., gingival ridges 102) and a low modulus or elastomeric material for the less rigid components of dental appliance 722 (e.g., shells 108). Further, with polyjet additive manufacturing, the modulus may be varied selectively across the dental appliance 722, and a different modulus may be used for the gingival ridge than is used for the shells, for different parts of a gingival ridge, or for different parts of a shell, for example. Similarly, a different modulus may be used for the anchoring shells than is used for the shells used to reposition individual teeth.

Figure 6A:
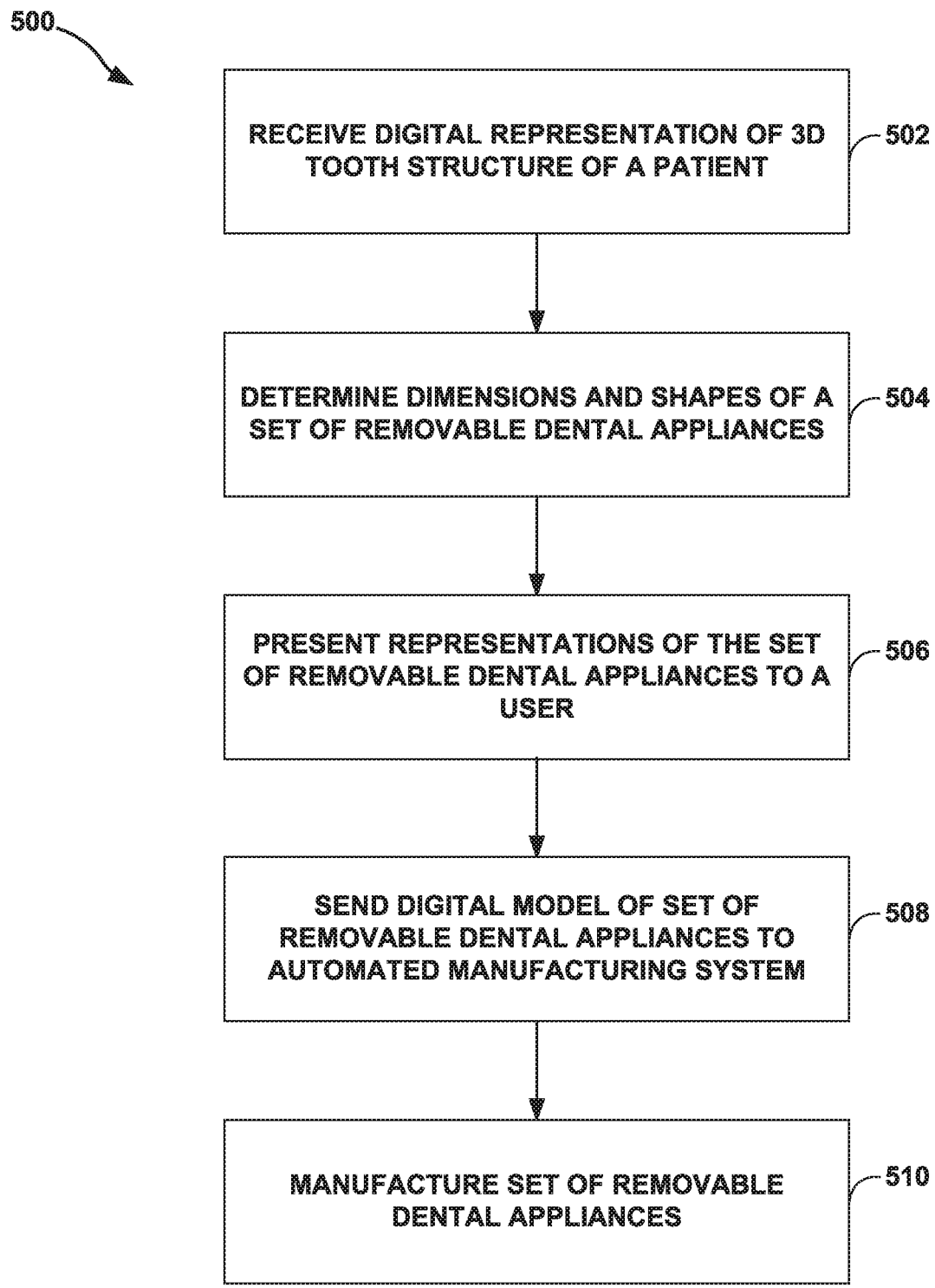
FIGS. 6A-6C are flow diagrams illustrating techniques for manufacturing a set of removable dental appliances that include a gingival ridge.
Figure 6B:
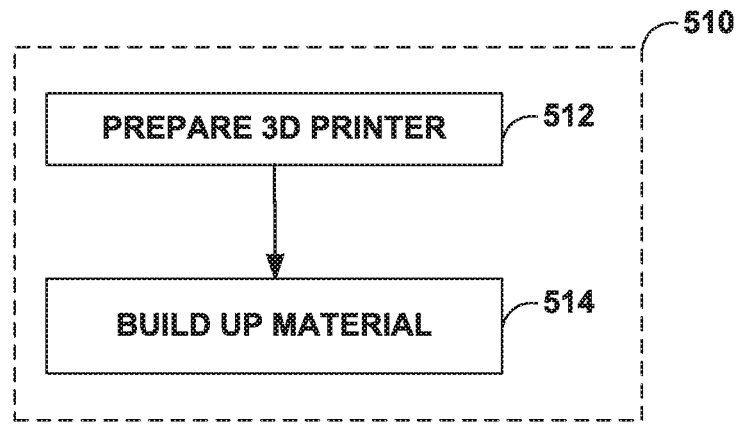
Figure 6C:
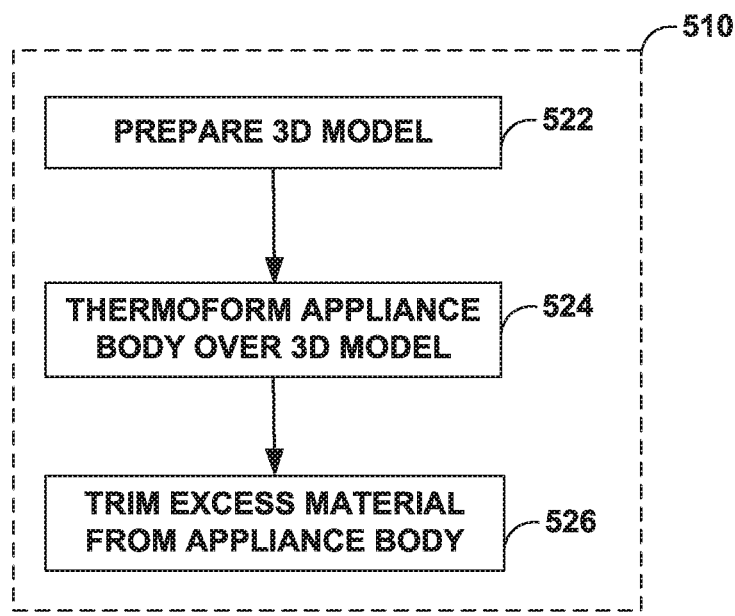

FIGS. 6A-6C are flow diagrams illustrating process 500 conducted at manufacturing facility 20 for construction of the set of removable dental appliances 22. In some examples, set of removable dental appliances 22 may include removable dental appliance 100. Computer 80 at manufacturing facility 20 receives digital dental anatomy data 16 including initial positions of one or more teeth of the patient and prescription data 18 (502) from clinic 14. Alternatively, computer 80 may retrieve the information from a database located within or otherwise accessible by computer 80. A trained user associated with computer 80 may interact with a computerized modeling environment running on computer 80 to develop a treatment plan relative to the digital representation of the patient's tooth structure and generate prescription data 18, if clinic 14 has not already done so. In other examples, computer 80 may automatically develop a treatment plan based solely on the patient's tooth structure and predefined design constraints.

Once computer 80 receives patient's tooth structure, computer 80 determines dimensions and shapes of a removable dental appliance for the patient (504). The dimensions and shapes of the removable dental appliance are configured to reposition the one or more teeth of the patient from their initial positions to final positions when the removable dental appliance is worn by the patient. In the same or additional examples, computer 80 determines dimensions and shapes of the set of removable dental appliances 22 for the patient configured to be worn in series.

In some examples, determining dimensions and shapes of the removable dental appliance includes selecting, with computer 80, the dimensions and shapes of the removable dental appliance according to a set of predefined design constraints. The set of predesigned design constraints may include one or more factors, including, but not limited to, at least one of a minimum and a maximum localized force applied to one or more of the surrounded teeth, at least one of a minimum and a maximum rotational force applied to one or more of the surrounded teeth, at least one of a minimum and a maximum translational force applied to one or more of the surrounded teeth, at least one of a minimum and a maximum total force applied to one or more of the surrounded teeth, and at least one of a minimum and a maximum stress or strain applied to the removable dental appliance, when the removable dental appliance is worn by the patient and the surrounded teeth are in their initial positions. Minimum applied forces are necessary to cause pressure on the periodontal ligament sufficient to result in bone remodeling and tooth movement.

Computer 80 may use finite element analysis (FEA) techniques to analyze forces on a patient's teeth as well as the removable dental appliance during the determination of the dimensions and shapes of the removable dental appliance. For example, computer 80 may apply FEA to a solid model of the patient's teeth as the modeled teeth move from their initial positions to their final positions representing a treatment including an ordered set of removable dental appliances. Computer 80 may use FEA to select the appropriate removable dental appliance to apply the desired forces on the teeth. In addition, computer 80 may use a virtual articulator to determine contact points between the teeth throughout the movement of the modeled teeth during the treatment. Computer 80 may further include occlusal contact forces, such as cusp interdigitation forces, in the FEA forces analysis in combination with forces from the removable dental appliance during the design of removable dental appliances in an ordered set of removable dental appliances. Computer 80 may further determine an order in which teeth are to be moved to optimize the application of forces, reduce treatment time, improve patient comfort, or the like.

In some examples, determining dimensions and shapes of removable dental appliance 100 includes selecting, with computer 80 thicknesses of appliance body 104, such as shells 108, and gingival ridges 102, to provide a stiffness suitable to reposition the one or more teeth of the patient from their initial positions to final positions when the removable dental appliance is worn by the patient. In some examples, a thickness of a respective shell of shells 108 may range between about 0.1 millimeters and about 2.0 millimeters thick, such as between about 0.25 and about 1.0 millimeters thick, or about 0.5 millimeters thick, whereas a thickness of gingival ridges 102 may be between about 0.05 millimeter and about 2.0 millimeters, or between about 0.1 millimeters and about 1.0 millimeter, or between about 0.25 and about 0.75 millimeters, or about 0.5 millimeters. In some examples, computer 80 may further select a material of the removable dental appliance, for example, a material as discussed above with respect to removable dental appliance 100, according to the predefined design constraints.

The dimensions and shapes of a removable dental appliance for the patient may be presented to a user via user interface 82 of computer 80 (506). In examples in which dimensions and shapes of the removable dental appliance are presented to a user via user interface of 82, the user may have the opportunity to adjust the design constraints or directly adjust the dimensions and shapes of the removable dental appliance before the design data is sent to computer-aided manufacturing system 84. In some examples, the dimensions and shapes of the removable dental appliance may be presented to a user by computer 80 directly as the removable dental appliance is manufactured by computer-aided manufacturing system 84. For example, computer 80 may send a digital model of removable dental appliance 100 to computer-aided manufacturing system 84, and computer-aided manufacturing system 84 manufactures removable dental appliance according to the digital model from computer 80.

However, even in examples where the dimensions and shapes of a removable dental appliance for the patient may be presented to a user via user interface of 82 of computer 80, following user approval, computer 80 sends a digital model of the removable dental appliance to computer-aided manufacturing system 84 (508), and computer-aided manufacturing system 84 manufactures removable dental appliance 100 of a set of removable dental appliances 22 according to the digital model from computer 80 (510). Manufacturing of removable dental appliances 22 (510) may include 3D printing, thermoforming, injection molding, lost wax casting, 5-axis milling, laser cutting, multi-axis robotic Fused Deposition Modeling (FDM), hybrid plastic and metal manufacturing techniques, such as snap-fitting, overmolding, or electroforming, as well as other manufacturing techniques.

In some examples, manufacturing removable dental appliance 100 (510) includes 3D printing removable dental appliance 100. FIG. 6B is a flow diagram illustrating a technique for 3D printing of a removable dental appliances that include a gingival ridge. As illustrated in FIG. 6B, 3D printing removable dental appliance 100 includes preparing the 3D printer (512). In some examples, preparing the 3D printer may include selecting and installing (e.g., loading) one or more polymers, one or more binders, or other materials to be printed by the 3D printer. In some examples, preparing the 3D printer may include creating a stage or form onto which the 3D printer will build-up material. Printing removable dental appliance 100 also includes building up the material (514). In some examples, building up material may include inserting materials onto the surface of the removable dental appliance 100 (e.g., gingival ridges 102 that include metal wires or ribbons) and recommencing building up material. In some examples, 3D printing removable dental appliance 100 may include post-processing to remove uncured resin, remove support structures, remove excess material, or to assemble various components, such as adhering a preformed gingival ridge 102 to a surface of removable dental appliance 100, or to dispense or build gingival ridge 102 directly onto a surface of removable dental appliance 100, which may also be performed in a clinical setting.

In some examples, manufacturing removable dental appliance 100 (510) includes thermoforming removable dental appliance 100. FIG. 6C is a flow diagram illustrating a technique for thermoforming a removable dental appliances that includes a gingival ridge. As illustrated in FIG. 6C, thermoforming removable dental appliance 100 includes preparing a 3D model of the dentition of the patient (522). In some examples, the 3D model may include a plaster (stone) model or another representation of the dentition of the patient, such as printed with a 3D printer. The 3D model may include the teeth in a final position of one or more teeth or an intermediate position of one or more teeth (e.g., between the initial position and a final position resulting from the orthodontic treatment). In some examples, the 3D model may include indentations or depressions (e.g., relative to a plane of the teeth) to facilitate forming at least one of the shells and the gingival ridges in the thermoformed and trimmed appliance body. Thermoforming removable dental appliance 100 includes thermoforming appliance body 104 over the 3D model (524). In some examples, thermoforming includes placing a polymer sheet onto the 3D model and heating the polymer sheet to cause the polymer sheet to substantially conform (e.g., conform or nearly conform) to the shape of the 3D model. In some examples, thermoforming may use a vacuum to facilitate conformation of the heated polymer sheet to the 3D model. Thermoforming removable dental appliance 100 includes trimming excess material from the applicant body to form the shells and the gingival ridges (526). In some examples, trimming may be performed manually or automated by CNC or robotic machinery such as, e.g., end mill or LASER cutter.

In some examples, both thermoforming and 3D-printing may be used to form different portions of an appliance body. For example, shells 108 may be formed by thermoforming, as discussed above, whereas gingival ridges 102 may be formed by 3D printing onto the thermoformed shells 108. In some examples, the techniques described with respect to FIGS. 6A-6C may be embodied within a computer-readable storage medium, such as a computer-readable storage medium of computing device 50, computer 80, or both. The computer-readable storage medium may store computer-executable instructions that, when executed, configure a processor to perform the techniques described with respect to FIGS. 6A-6C.

The techniques of FIGS. 6A-6C may be applied to design and manufacture of each of an ordered set of removable dental appliances 22. For example, each removable dental appliance in the ordered set of removable dental appliances 22 may be configured to incrementally reposition the teeth of the patient. In this manner, the ordered set of removable dental appliances 22 may be configured to reposition the teeth of the patient to a greater degree than any one of the removable dental appliances within the set of the removable dental appliances 22. Such an ordered set of removable dental appliances 22 may specifically be configured to incrementally reposition the one or more teeth of the patient from their initial positions to final positions as the removable dental appliances of the ordered set of removable dental appliances 22 for the patient are worn sequentially by the patient.

Figure 7:
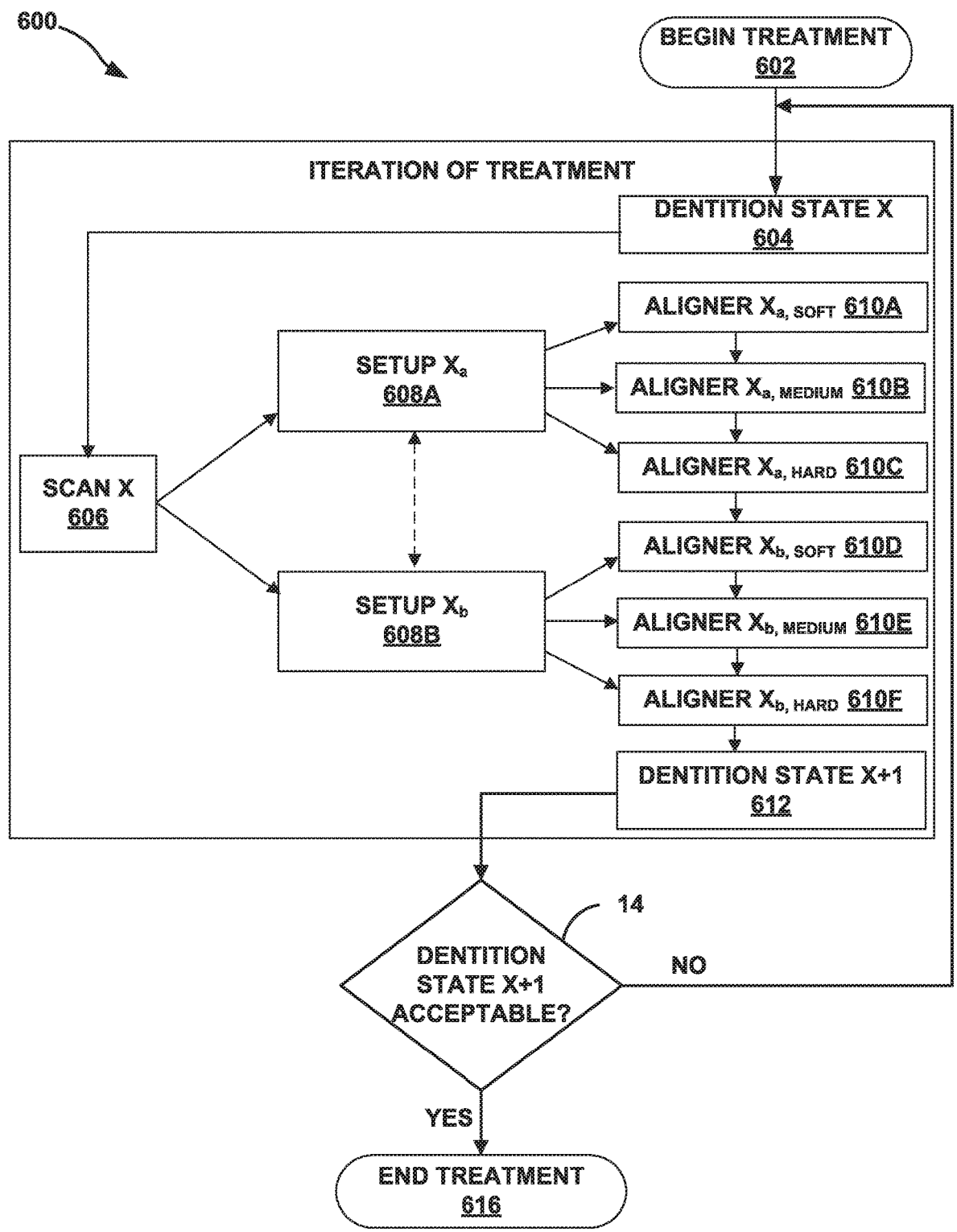
FIG. 7 is a flow diagram illustrating successive iterations of treatment using an ordered set of removable dental appliances that include a gingival ridge.

FIG. 7 is a flow diagram 600 illustrating successive iterations of treatment using an ordered set of removable dental appliances. The ordered set of removable dental appliances is configured to reposition one or more teeth of a patient. In some examples, the ordered set of removable dental appliances may include removable dental appliance 100.

Treatment begins with the first iteration of treatment (602). At the beginning of the first iteration of treatment, the patient's teeth are at their initial positions as represented by detention state X (604). A scan of the patient's teeth, for example, as described above with respect to FIG. 2, are taken to facilitate the design of the ordered set of removable dental appliances (606). From the scan of patient's teeth, a computer, e.g., computing device 50, determines two different shape and dimensions for removable dental appliances in the ordered set: first setup Xa 608A and second setup Xb 608B. Example techniques for creating a digital model of a patient's teeth are described in U.S. Pat. No. 8,738,165 to Cinader, et al., titled, "METHODS OF PREPARING A VIRTUAL DENTITION MODEL AND FABRICATING A DENTAL RETAINER THEREFROM," and issued on May 27, 2014. U.S. Pat. No. 8,738,165 is herein incorporated by reference in its entirety. The computer may determine first setup Xa 608A and second setup Xb 608B by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses, positions, shapes, and dimensions of shells and gingival ridge of the removable dental appliances in the ordered set to produce the forces required to move the patient's teeth from the initial positions to their desired positions. The modeled forces applied by removable dental appliances in the ordered set may further be based on the incremental positional movements of the patient's teeth during the treatment. In this manner, the computer may design each of the removable dental appliances in the ordered set according to expected forces applied on the teeth in the predicted positions of the teeth at the time during the treatment the removable dental appliances in the ordered set are to be worn by the patient.

In some examples, at least one, such as three, different removable dental appliances in the set of removable dental appliances can be manufactured using each of first setup Xa 608A and second setup Xb 608B to produce at least two, such as six, removable dental appliances in the set of removable dental appliances. For example, first setup Xa 608A may be used to manufacture first aligner Xa, SOFT 610A, second aligner Xa, MEDIUM 610B, and third aligner Xa, HARD 610C; and second setup Xb 608B may be used to manufacture fourth aligner Xb, SOFT 610D, fifth aligner Xb, MEDIUM 610E, and sixth aligner Xb, HARD 610F. First, second, and third aligners 610A to 610C may be substantially the same shape and dimensions but may include materials with different stiffness characteristics. For example, the second and third aligners 610B and 610C may have higher stiffness characteristics than first aligner 610A, and third aligner 610C may have higher stiffness characteristics than second aligner 610B. Similarly, the fourth, fifth, and sixth aligners 610D to 610F may be substantially the same shape and dimensions but include materials with different stiffness characteristics. In some examples, first aligner 610A may have the same stiffness characteristics as the fourth aligner 610D, such as a relatively soft polymeric material. Similarly, second aligner 610B may have the same stiffness characteristics as the fifth aligner 610E, such as a relatively stiffer polymeric material than first aligner 610A. Likewise, third aligner 610C may have the same stiffness characteristics as the sixth aligner 610F, such as a relatively stiffer polymeric material than second aligner 610B.

Aligners 610A to 610F in the ordered set of removable dental appliances may be worn in sequence over time by the patient. For example, each of aligners 610A to 610F in the ordered set of removable dental appliances may be worn between about 1 week and about 6 weeks, such as between about 2 weeks and about 4 weeks, or about 3 weeks. Following the treatment plan using aligners 610A to 610F, the patient's teeth may be at their final positions for the first iteration of treatment as represented by detention state X+1 (612).

Once patient's teeth are at or near dentition state X+1, the patient may return to the clinician who may evaluate the result of the first iteration of treatment (614). If the first iteration of treatment has resulted in acceptable final positions of the patient's teeth, then the treatment may be ended (616). However, if the first iteration of treatment did not result in acceptable final positions of the patient's teeth, one or more additional iterations of treatment may be performed. To begin the next iteration of treatment, the clinician may take another scan of the patient's teeth to facilitate the design of a subsequent ordered set of removable dental appliances (606). In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of FIG. 7 represent one specific example, and a variety of modifications may be made to the techniques of FIG. 7 within the spirit of this disclosure. For example, an ordered set of removable dental appliances may include more or less than six removable dental appliances. As another example, each removable dental appliance in the ordered set of removable dental appliances may have unique shapes and dimensions, and each removable dental appliance in the ordered set of removable dental appliances may be made of material having substantially the same or similar stiffness characteristics. As another example, each removable dental appliance in the ordered set of removable dental appliances may include a selected thickness, width, height, length, shape, material, or presence of the gingival ridges. For example, first aligner Xa, SOFT 610A, second aligner Xa, MEDIUM 610B, and third aligner Xa, HARD 610C may be a first thickness of the gingival ridge; whereas fourth aligner Xb, SOFT 610D, fifth aligner Xb, MEDIUM 610E, and sixth aligner Xb, HARD 610F may be a second, different thickness of the gingival ridge. The first thickness may be less than the second thickness. As another example, each removable dental appliance in the ordered set of removable dental appliances may include selected dimensions of one or more gingival ridge, selected shapes of one or more gingival ridge, or both.

Examples

Figure 8A:
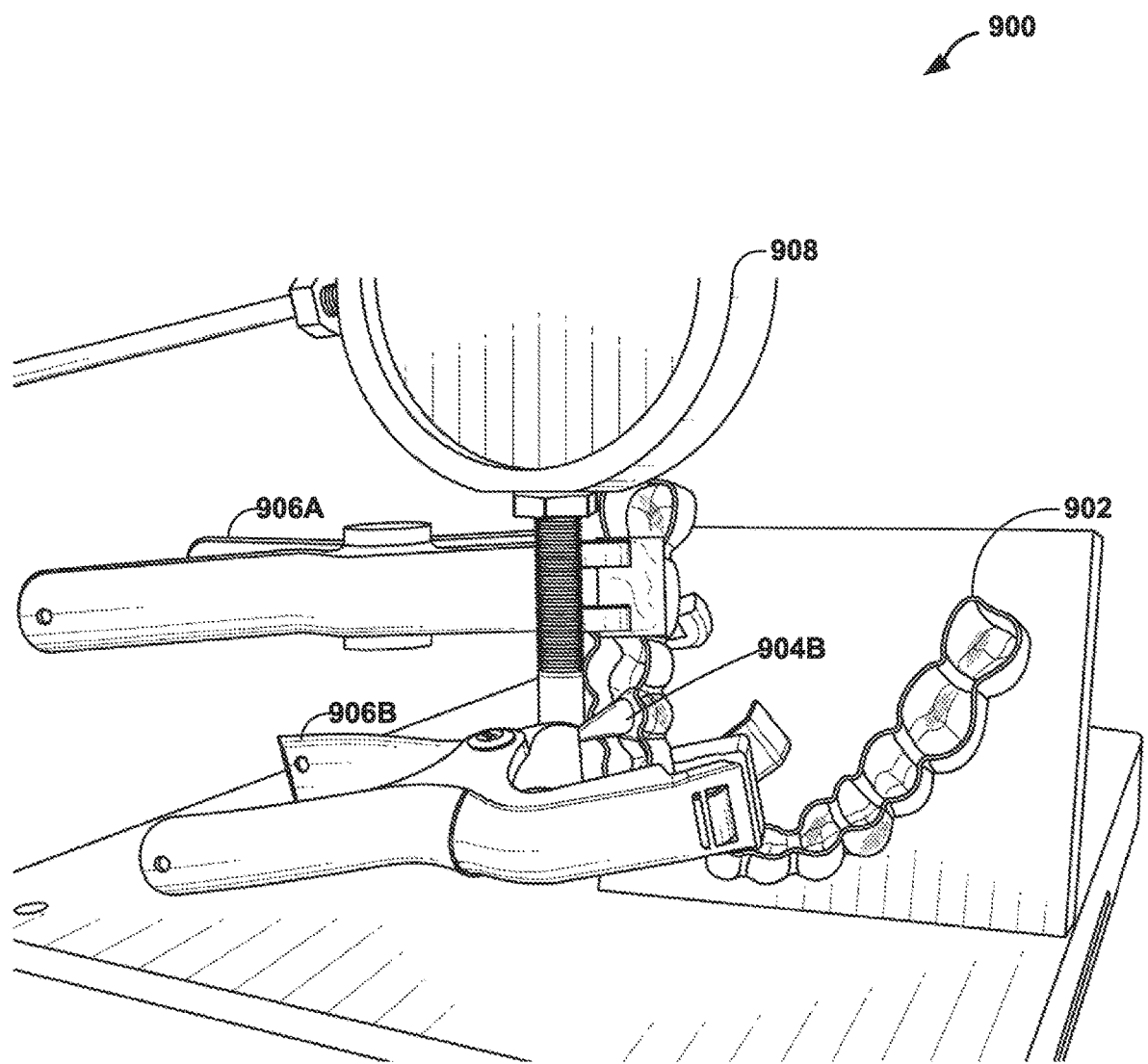
FIGS. 8A and 8B are line drawings illustrating an experimental apparatus for measuring a force applied to the root of a model first bicuspid by a removable dental appliance.
Figure 8B:
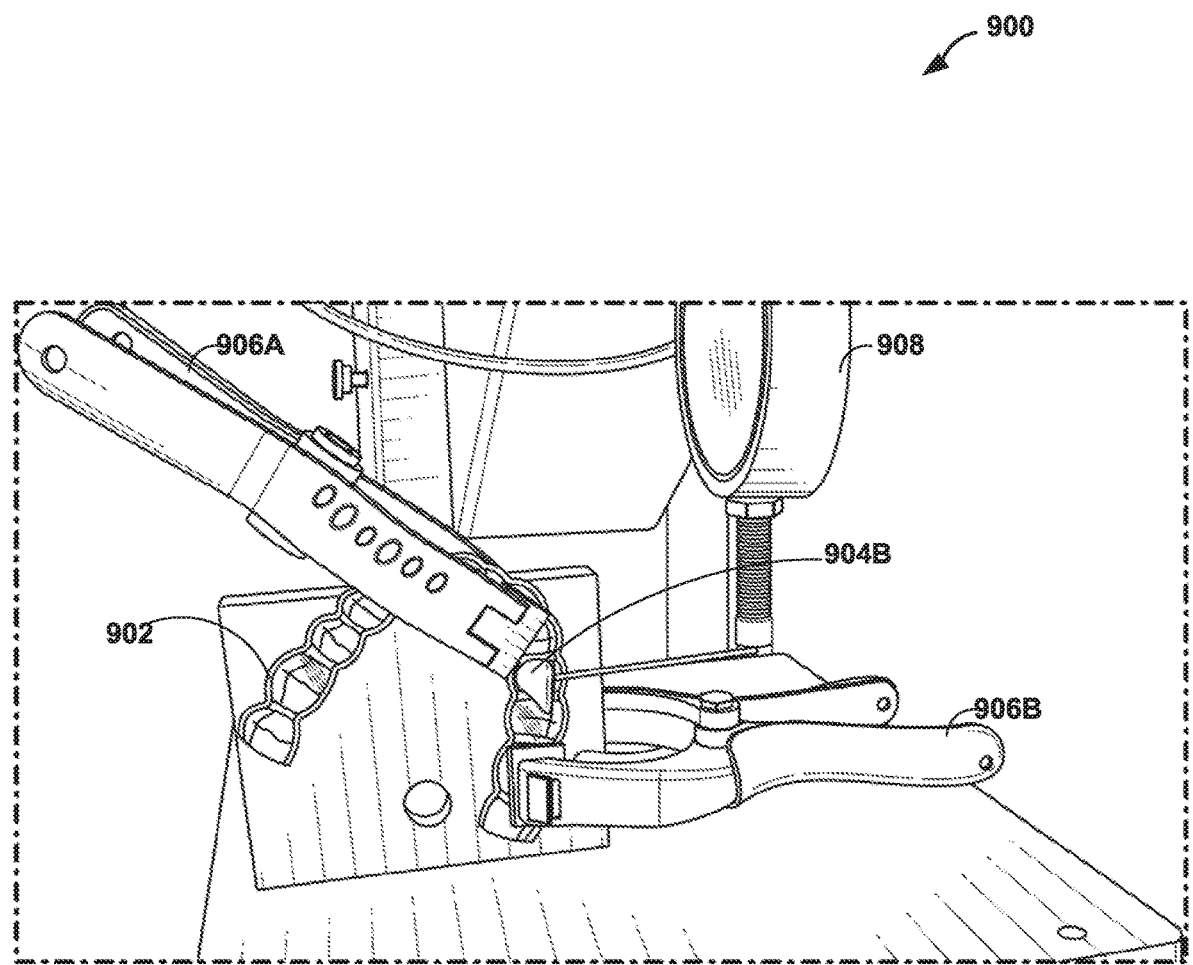

Tests were done to evaluate the effect of a gingival ridge and compare the performance to tooth attachments. FIGS. 8A and 8B illustrate an experimental apparatus 900 for measuring a force applied to the root of a model first bicuspid by removable dental appliances. A removable dental appliance 902 including a gingival ridge formed in the appliance body at the shell of the left first bicuspid and a pocket to receive a tooth attachment bonded to the right first bicuspid was formed. The removable dental appliance 902 was thermoformed of 0.75 mm thick Duran PET-G thermoplastic material. Three-dimensional models of the right first bicuspid 904A (including an attachment) and the left first bicuspid 904B (collectively, tooth models 904), were 3D printed and placed into the respective shells of removable dental appliance 902. Removable dental appliance 902 was clamped by clamps 906A and 906B to an angle bracket at the corresponding lateral incisor and at the first molar. The clamps were shaped such that the occlusal surfaces of removable dental appliance 902 were held against the angle bracket without applying forces or causing displacement of the labial and lingual surfaces of removable dental appliance 902.

A Lloyd Instruments LF-Plus Digital Testing Machine, available from AMETEK Test & Calibration Instruments, Largo, Fla. ("test machine 908"), was used to apply force to the root of the tooth model. Typically, a maximum torque applied to a tooth during orthodontic treatment is about 10 Newton-millimeters (N-mm). For tooth models 904, the distance from the center of the labial tooth face to the base of the root was about 17.0 mm. The maximum force applied to the base of the root was 10 N-mm/17.0 mm=0.59 N. Forces were applied to the root of tooth models 904 in the mesial, distal, labial and lingual directions. Five consecutive runs were performed for each test to measure forces applied to the root of tooth models 904 in the mesial, distal, labial and lingual directions. The measured forces were averaged for the runs. The first run of each test was excluded from the average because of slip between removable dental appliance 902 and tooth models 904 during some tests. The second and subsequent runs were performed without resetting tooth models 904 in removable dental appliance 902.

Figure 9:
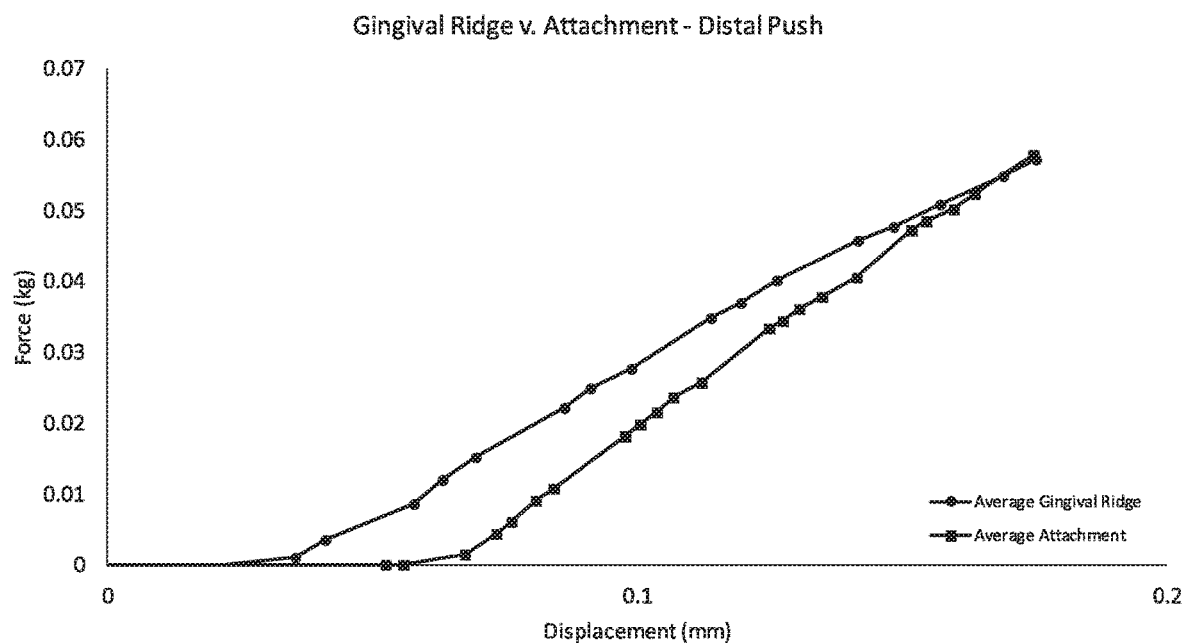
FIGS. 9-14 are graphs illustrating experimental results of average measured forces applied to the root of tooth models by a removable dental appliance including a gingival ridge at the left first bicuspid and using an attachment on the model right first bicuspid.
Figure 10:
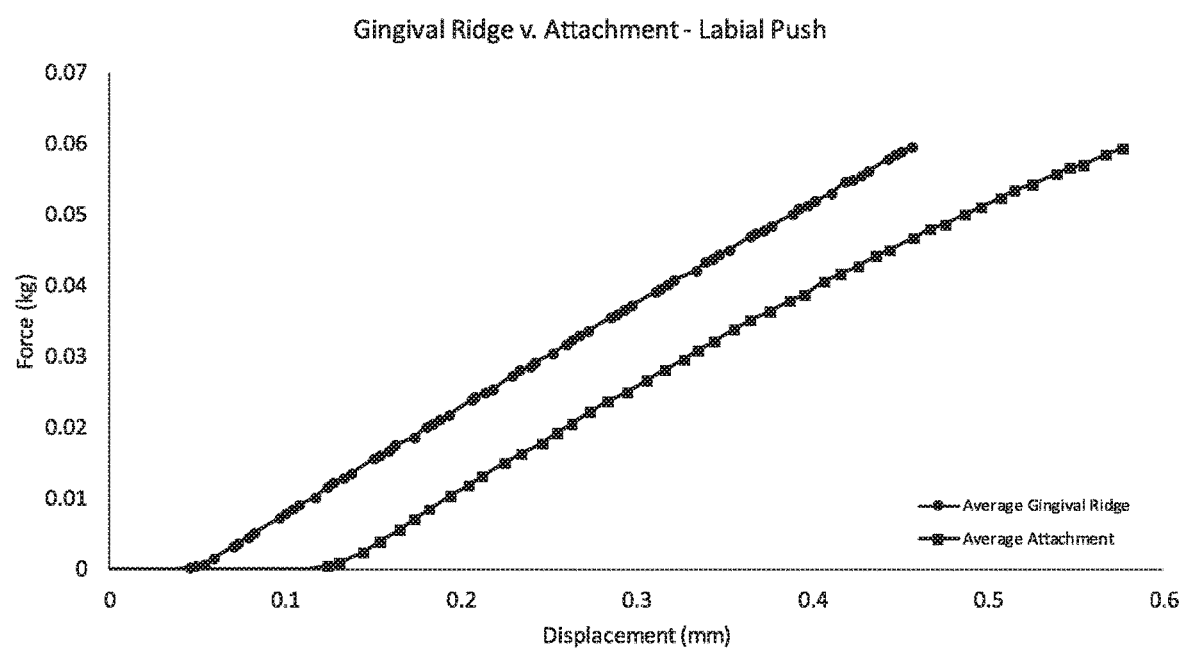
Figure 11:
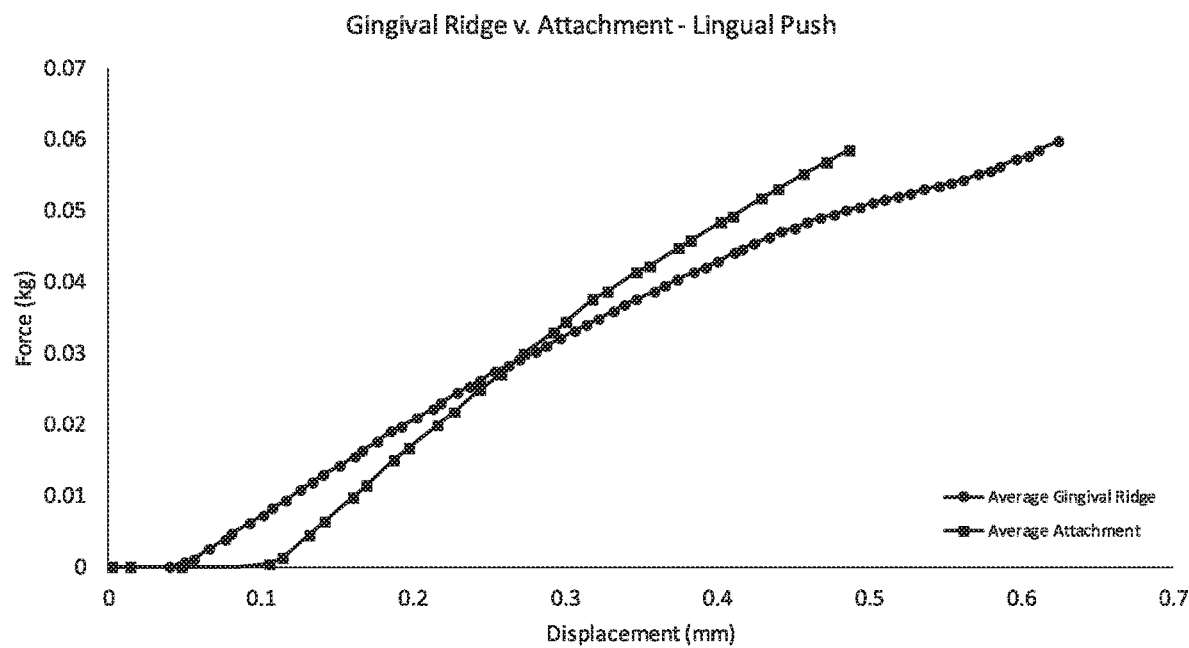
Figure 12:
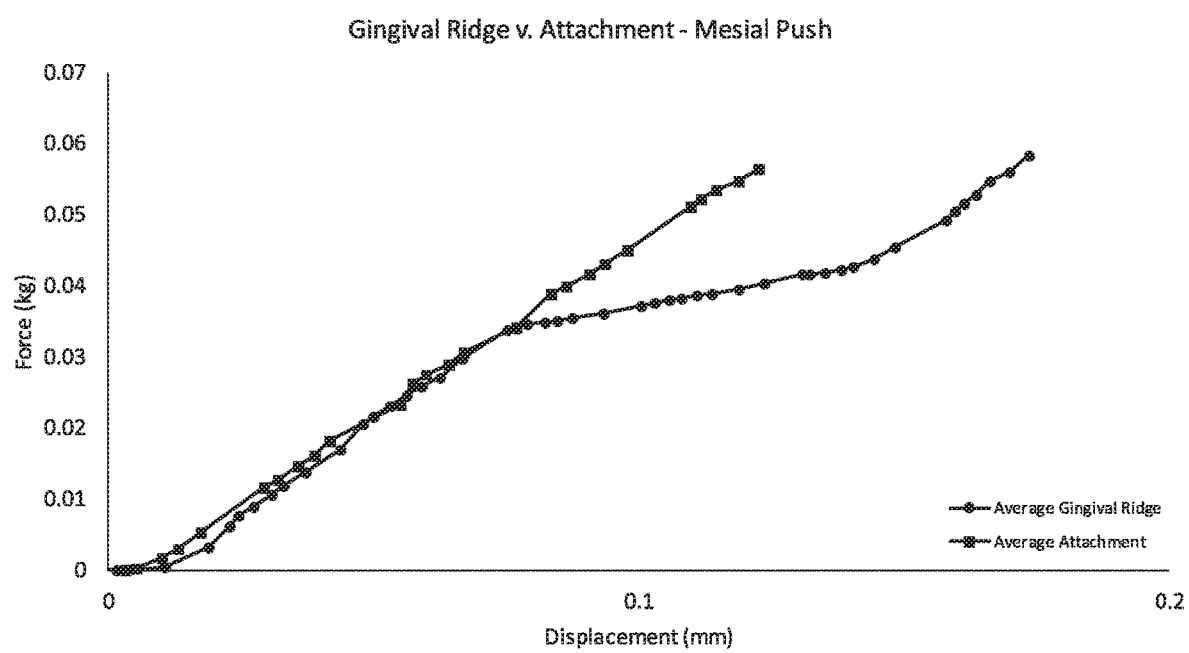

FIGS. 9-12 illustrate an average measured force applied to the root of tooth models 904 in removable dental appliance 902, including a gingival ridge at the left first bicuspid 904B ("Average Gingival Ridge") and using an attachment on the model right first bicuspid 904A ("Average Attachment"). The displacement values are relative to the point at which the root of tooth models 904 is initially contacted in the first test such that the graphs illustrate a relative displacement, rather than an absolute displacement, of tooth model 904. FIG. 9 illustrates measured force (kilogram, "kg") applied in a distal direction, (e.g., a "distal push") applied to tooth models 904 versus displacement (millimeters, "mm") for removable dental appliance 902 using an attachment fixed to the model right first bicuspid 904A ("Attachment") and using a gingival ridge at the model left first bicuspid 904B ("Gingival Ridge"). FIG. 10 illustrates measured force in a labial direction (e.g., a "labial push") applied to tooth models 904 versus displacement (mm) for removable dental appliances 902 using the Attachment and the Gingival Ridge. FIG. 11 illustrates measured force in a lingual direction (e.g., a "lingual push") applied to tooth models 904 versus displacement (mm) for removable dental appliances 902 using the Attachment and the Gingival Ridge. FIG. 12 illustrates measured force in a mesial direction (e.g., a "mesial push") applied to tooth models 904 versus displacement (mm) for removable dental appliances 902 using the Attachment and the Gingival Ridge. As indicated by FIGS. 9-12, the performance of the removable dental appliance with the gingival ridge (and no tooth attachment) is similar to the performance the removable dental appliance with the tooth attachment.

Figure 13:
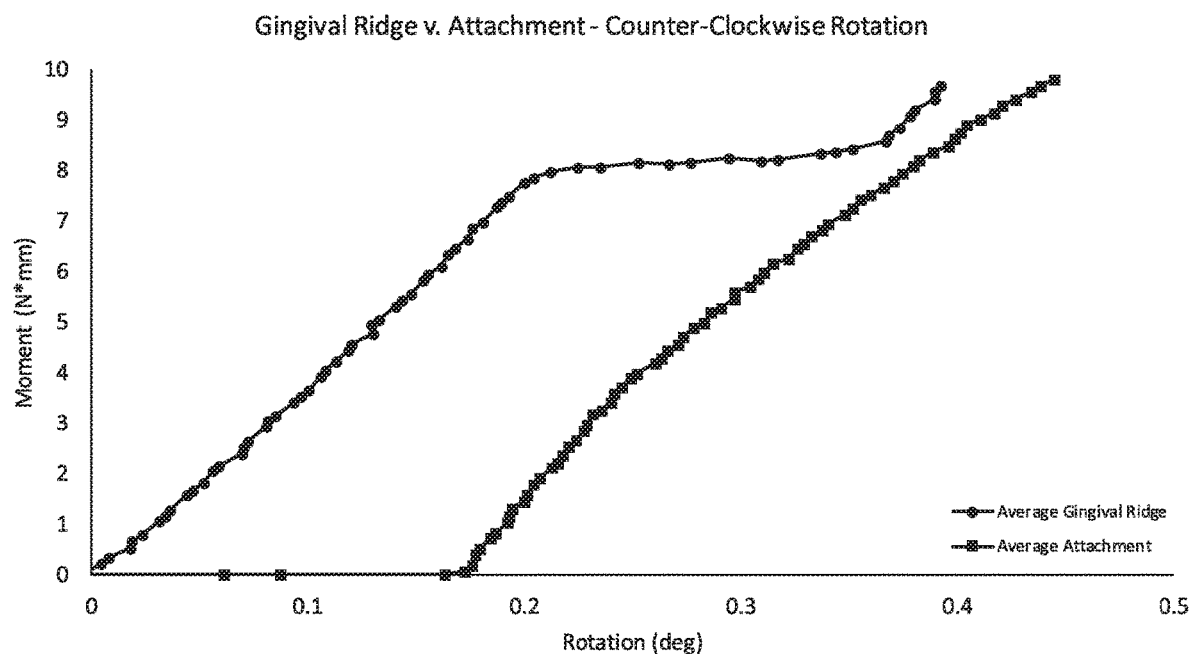
Figure 14:
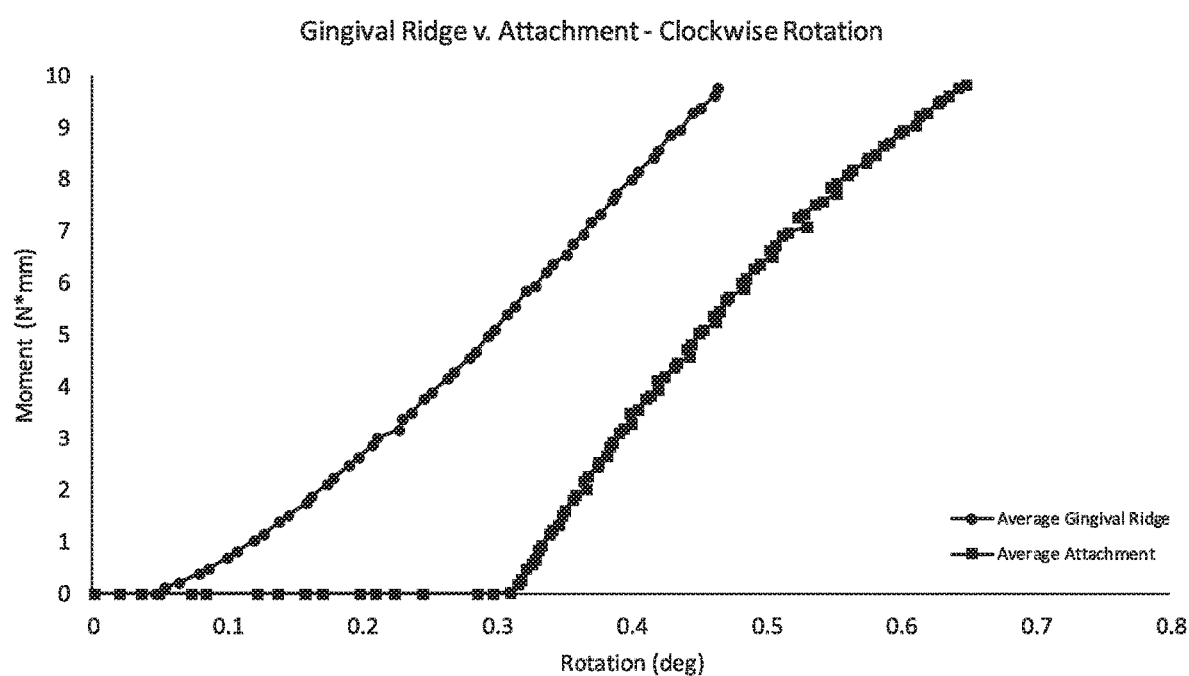

Tests were also done where a rotational moment was applied to the tooth. Removable dental appliance 902 was clamped to an angle bracket at the lateral incisor and at the first molar, as described above. Test machine 908 was used to apply a force to the end of a metal pin inserted into a hole in tooth models 904. Moments were applied to tooth models 904 in the clockwise and counterclockwise directions. The resulting moment tended to rotate tooth models 904. The ability of the gingival ridge and attachment to resist the rotational moment was evaluated. Maximum torque typically applied to a tooth during orthodontic treatment is about 10 N-mm. The distance from the center axis of the first bicuspid to the end of the metal pin was about 35.0 mm. The maximum force applied to the end of the metal pin was 10 N-mm/35.0 mm=0.29 N. Results for moments applied to the tooth models 904 are shown in FIGS. 13 and 14. The angular rotations shown in FIGS. 13 and 14 have been corrected to remove the apparent rotation component caused by elastic deformation of the metal pin. FIG. 13 illustrates measured force (e.g., moment, Newton-millimeter ("N-mm")) in a counter clockwise direction (e.g., a "Counter Clockwise Rotation") applied to tooth models 904 versus rotation (degrees, "deg") for removable dental appliances 902 using the Attachment and the Gingival Ridge. FIG. 14 illustrates measured force (e.g., moment, N-mm) in a clockwise direction (e.g., a "Clockwise Rotation") applied to tooth models 904 versus rotation (deg) for removable dental appliances 902 using the Attachment and the Gingival Ridge. The results illustrate the ability of the gingival ridge to resist tooth rotation caused by a rotational moment applied to the tooth. The similar performance of the gingival ridge and tooth attachment indicate the gingival ridge may be as effective as tooth attachments at rotating malposed teeth toward the desired rotational angle.

Various examples have been described. These and other examples are within the scope of the following claims.

List of Illustrative Embodiments

1. A removable dental appliance comprising:
   an appliance body configured to at least partially surround a plurality of teeth of a dental arch of a patient, wherein the appliance body comprises:
      a shell shaped to engage a tooth of the plurality of teeth in an initial position of the tooth; and
      a gingival ridge extending at least from a first interproximal region of the appliance body at a mesial portion of the shell along a gingival edge of the shell to a second interproximal region of the appliance body at a distal portion of the shell,
      wherein the gingival ridge is configured to engage a lingual surface of the tooth below a height of contour of the tooth or a labial surface of the tooth below the height of contour to enable the appliance body to apply a force vector at a contact point on the tooth to cause movement of the tooth toward a desired position of the tooth when the removable dental appliance is worn by the patient.

2. The removable dental appliance of embodiment 1, wherein the removable dental appliance comprises an aligning tray.

3. The removable dental appliance of embodiment 1 or 2, wherein the gingival ridge results in a gingival portion of the appliance body being stiffer than a labial face of the shell or a lingual face of the shell, and wherein the gingival ridge concentrates a deformation force at a selected portion of the appliance body when the removable dental appliance is worn by the patient.

4. The removable dental appliance of any one of embodiments 1 through 3, wherein the shell comprises a surface that defines a void internal to the shell, wherein the surface is shaped to receive the tooth in a desired position.

5. The removable dental appliance of embodiment 4, wherein the gingival ridge is configured to engage the lingual surface of the tooth and the labial surface of the tooth to urge an occlusal portion of the surface toward an occlusal surface of the tooth when the removable dental appliance is worn by the patient.

6. The removable dental appliance of embodiment 4 or 5, wherein the appliance body is configured to apply a force vector at a contact point on the tooth opposite from a portion of the void to cause movement of the tooth toward the portion of the void when the removable dental appliance is worn by the patient.

7. The removable dental appliance of embodiment 6, wherein the contact point is a first contact point and the force vector is a first force vector, wherein the surface of the shell further defines a second portion of the void, and wherein the appliance body is configured to apply a second force vector at a second contact point on the tooth opposite from the second portion of the void to cause movement of the tooth toward the second portion of the void.

8. The removable dental appliance of embodiment 7, wherein the first contact point and the second contact point are on the opposing sides of the tooth.

9. The removable dental appliance of embodiment 7, wherein the first contact point is located near an occlusal surface of the tooth, and wherein the second contact point is located near a gingival surface of the tooth.

10. The removable dental appliance of embodiment 7, wherein the first contact point is located on a lingual surface of the tooth, and wherein the second contact point is located on a labial surface of the tooth.

11. The removable dental appliance of embodiment 7, wherein the first contact point and the second contact point are on the same side of the tooth.

12. The removable dental appliance of any one of embodiments 1 to 11, wherein the gingival ridge reduces engagement of the shell on at least one of the lingual surface of the tooth or the labial surface of the tooth adjacent the gingival ridge.

13. The removable dental appliance of any one of embodiments 1 to 12, wherein the gingival ridge comprises a first gingival ridge portion and a second gingival ridge portion, wherein the first gingival ridge portion extends from the first interproximal region of the appliance body at the mesial portion of the shell to a first position on the gingival edge of the shell, and wherein the second gingival ridge portion extends from a second position on the gingival edge of the shell to the second interproximal region of the appliance body at the distal portion of the shell.

14. The removable dental appliance of any one of embodiments 1 through 13, wherein a thickness of the gingival ridge is between about 0.1 millimeters and about 0.5 millimeter, and wherein a width of the gingival ridge is between about 0.5 millimeters and about 2.0 millimeters.

15. The removable dental appliance of any one of embodiments 1 through 14, wherein a cross-section of the gingival ridge is substantially constant along the gingival edge of the appliance body.

16. The removable dental appliance of any one of embodiments 1 to 14, wherein a cross-section of the gingival ridge varies along the gingival edge of the appliance body.

17. The removable dental appliance of any one of embodiments 1 to 16, wherein the gingival ridge results in a step change in thickness of the appliance body.

18. The removable dental appliance of any one of embodiments 1 to 17, wherein the gingival ridge comprises a first material, and wherein the shell comprises a second material different than the first material.

19. The removable dental appliance of embodiment 18, wherein the gingival ridge comprises a first portion and a second portion, wherein the first portion comprises a first material having a first modulus and the second portion comprises a second, different material having a second, different modulus.

20. The removable dental appliance of any one of embodiments 1 to 19, wherein the gingival ridge is positioned at a gingival-most edge of the removable dental appliance.

21. The removable dental appliance of any one of embodiments 1 through 20, wherein the removable dental appliance further comprises a second gingival ridge extending from a third interproximal region at a mesial portion of the shell along a gingival edge of the shell to a fourth interproximal region of the appliance body at a distal portion of the shell.

22. The removable dental appliance of any one of embodiments 1 to 21, wherein the appliance body further comprises:

a second shell adjacent to the shell in a mesial direction, wherein the second shell is shaped to engage a second tooth of the plurality of teeth in an initial position of the second tooth; and a third shell adjacent to the shell in a distal direction, wherein the third shell is shaped to engage a third tooth of the plurality of teeth in an initial position of the third tooth, wherein the gingival ridge extends at least from a portion of the second shell to a portion of the third shell.

23. The removable dental appliance of embodiment 22, wherein the gingival ridge distributes a deformation force to the second shell and the third shell when the removable dental appliance is worn by the patient.

24. The removable dental appliance of any one of embodiments 1 to 23, further comprising a reinforcing rib extending from an exterior surface of the appliance body, wherein the reinforcing rib results in the appliance body at the reinforcing rib being stiffer than adjacent portions of the appliance body.

25. The removable dental appliance of embodiment 24, wherein the reinforcing rib is positioned on the appliance body adjacent to the shell.

26. The removable dental appliance of embodiment 24 or 25, wherein the reinforcing rib extends in the gingival-occlusal direction on the appliance body.

27. A system comprising an ordered set of removable dental appliances configured to reposition one or more teeth of a patient, wherein at least one removable dental appliance in the set of removable dental appliances comprising the removable dental appliance of any one of embodiments 1 through 28.

28. A method comprising:

forming a model of dental anatomy of a patient providing desired positions of a plurality of teeth; and forming, based on the model, a removable dental appliance comprising the removable dental appliance of any one of embodiments 1 through 12.

29. The method of embodiment 28, wherein forming the removable dental appliance comprises three-dimensional printing or thermoforming the removable dental appliance and the gingival ridge as an integral piece.

30. The method of embodiment 28, wherein forming the removable dental appliance comprises:

three-dimensional printing or thermoforming the removable dental appliance; and forming the gingival ridge separate from the removable dental appliance.

31. The method of embodiment 30, wherein the removable dental appliance comprises an alignment guide configured to receive the gingival ridge, wherein the alignment guide comprises at least one recess, ridge, or post integrally formed with the appliance body, and wherein the method further comprises inserting the gingival ridge into the alignment guide.

32. The method of embodiment 30 or 31, wherein forming the gingival ridge comprises bending and cutting a wire to define the gingival ridge.

33. The method of embodiment 30 or 31, wherein forming the gingival ridge comprises extruding the gingival ridge onto the appliance body.

34. A method comprising:

receiving, by a computing device, a digital representation of a three-dimensional dental anatomy of a patient, the dental anatomy providing initial positions of a plurality of teeth;

determining, by the computing device, a movement of a tooth of the plurality of teeth from the initial position of the tooth to a desired position of the tooth;

determining, by the computing device, a force vector applied at a contact point on the tooth to achieve the movement;

determining, by the computing device, a removable dental appliance design comprising a position of a gingival ridge on a removable dental appliance to cause the force vector, wherein the removable dental appliance comprises an appliance body configured to at least partially surround a plurality of teeth of the patient, wherein the appliance body comprises:

a shell shaped to engage the tooth in the initial position of the tooth; and a gingival ridge extending at least from a first interproximal region of the appliance body at a mesial portion of the shell along a gingival edge of the shell to a second interproximal region of the appliance body at a distal portion of the shell, wherein the gingival ridge is configured to engage a lingual surface of the tooth below a height of contour of the tooth or a labial surface of the tooth below the height of contour to enable the appliance body, and wherein the gingival ridge results in a gingival portion of the appliance body being stiffer than a labial face of the shell or a lingual face of the shell; and transmitting, by the computing device, a representation of the removable dental appliance to a computer-aided manufacturing system.

35. The method of embodiment 34, wherein the movement comprises a tooth root movement, a rotation, or a torque.

36. The method of embodiment 34 or 35, wherein determining the movement of the tooth comprises determining, by the computing device, a plurality of movements, each movement of the plurality of movements corresponding to a respective movement of a respective tooth of the plurality of teeth from an initial position of the respective tooth to a desired position of the respective tooth, the method further comprising ordering the plurality of movements by difficulty or length of expression to prioritize the plurality of movements.

37. The method of any one of embodiments 34 through 36, wherein the removable dental appliance design further comprises dimensions and shapes of at least one of the shell or the gingival ridge.

38. The method of any one of embodiments 34 through 37, wherein determining the removable dental appliance design comprises determining, by the computing device, the position of the gingival ridge on the appliance body and dimensions and shapes of the gingival ridge to distribute a deformation force to the appliance body at the first interproximal region and the appliance body at the second interproximal region when the removable dental appliance is worn by the patient.

39. The method of any one of embodiments 34 through 38, wherein determining the removable dental appliance design comprises determining, by the computing device, dimensions and shapes of a surface of the shell, wherein the surface defines a void internal to the shell, wherein the surface is shaped to receive the tooth in a desired position, and wherein the gingival ridge extends from an interior surface of the appliance body into the void.

40. The method of embodiment 39, wherein determining the removable dental appliance design comprises determining, by the computing device, the position of the gingival ridge on the appliance body and dimensions and shapes of the gingival ridge to urge an occlusal portion of the surface toward an occlusal surface of the tooth when the removable dental appliance is worn by the patient.

41. The method of embodiment 39 or 40, wherein determining the force vector comprises determining, by the computing device, the force vector applied at the contact point on the tooth opposite from a portion of the void to cause movement of the tooth toward the portion of the void when the removable dental appliance is worn by the patient.

42. The method of any one of embodiments 39 through 41, wherein the force vector is a first force vector and the contact point is a first contact point, wherein the surface of the shell further defines a second portion of the void, and wherein determining the removable dental appliance design comprises determining, by the computing device, dimensions and shapes of the shell and the gingival ridge to apply a second force vector at a second contact point on the tooth opposite from the second portion of the void to cause movement of the tooth toward the second portion of the void.

43. The method of embodiment 42, wherein the first contact point and the second contact point are on the opposing sides of the tooth.

44. The method of embodiment 42, wherein the first contact point is located near an occlusal surface of the tooth, and wherein the second contact point is located near a gingival surface of the tooth.

45. The method of embodiment 42, wherein the first contact point is located on a lingual surface of the tooth, and wherein the second contact point is located on a labial surface of the tooth.

46. The method of embodiment 42, wherein the first contact point and the second contact point are on the same side of the tooth.

47. The method of any one of embodiments 34 through 46, wherein the gingival ridge comprises a first gingival ridge portion and a second gingival ridge portion, and wherein determining the removable dental appliance design comprises:

determining, by the computing device, dimensions and shapes of the first gingival ridge portion extending from the first interproximal region of the appliance body at the mesial portion of the shell to a first position on the gingival edge of the shell; and determining, by the computing device, dimensions and shapes of the second gingival ridge portion extending from a second position on the gingival edge of the shell to the second interproximal region of the appliance body at the distal portion of the shell.

48. The method of any one of embodiments 34 through 47, wherein determining the removable dental appliance design comprises determining, by the computing device, a cross-section of the gingival ridge, and wherein the cross-section of the gingival ridge is substantially constant along the gingival edge of the appliance body or varies along the gingival edge of the appliance body.

49. The method of any one of embodiments 34 through 48, wherein determining the removable dental appliance design comprises determining, by the computing device, a first material of the gingival ridge, and wherein the shell comprises a second material different than the first material.

50. The method of any one of embodiments 34 through 49, wherein determining the removable dental appliance design comprises determining, by the computing device, a variation in a modulus of the gingival ridge along a length of the gingival ridge.

51. The method of any one of embodiments 34 through 50, wherein determining the removable dental appliance design comprises determining, by the computing device, a position of a second gingival ridge extending from a third interproximal region at a mesial portion of the shell along a gingival edge of the shell to a fourth interproximal region of the appliance body at a distal portion of the shell.

52. The method of any one of embodiments 34 through 51, wherein the appliance body further comprises:
   a second shell adjacent to the shell in a mesial direction, wherein the second shell is shaped to engage a second tooth of the plurality of teeth in an initial position of the second tooth; and
   a third shell adjacent to the shell in a distal direction, wherein the third shell is shaped to engage a third tooth of the plurality of teeth in an initial position of the third tooth,
   wherein determining the removable dental appliance design comprises determining, by the computing device, a position of the gingival ridge extending at least from a portion of the second shell to a portion of the third shell.

53. The method of any one of embodiments 34 through 52, wherein the appliance body further comprises a reinforcing rib, and wherein determining the removable dental appliance design comprises:
   determining, by the computing device, a position of the reinforcing rib on an exterior lingual surface or an exterior labial surface of the appliance body; and
   determining, by the computing device, dimensions and shapes of the reinforcing rib to result in the appliance body at the reinforcing rib being stiffer that adjacent portions of the appliance body.

54. The method of any one of embodiments 34 through 53, wherein forming the removable dental appliance comprises three-dimensional printing the removable dental appliance and the gingival ridge as an integral piece.

55. The method of any one of embodiments 34 through 54, wherein forming the removable dental appliance comprises:
   three-dimensional printing the removable dental appliance; and
   forming the gingival ridge separate from the removable dental appliance.

56. The method of embodiment 55, wherein the removable dental appliance comprises an alignment guide configured to receive the gingival ridge, wherein the alignment guide comprises at least one recess, ridge, or post integrally formed with the appliance body, and wherein the method further comprises inserting the gingival ridge into the alignment guide.

57. The method of embodiment 55 or 56, wherein forming the gingival ridge comprises bending and cutting a wire to define the gingival ridge.

58. The method of any one of embodiments 55 through 57, wherein forming the gingival ridge comprises extruding the gingival ridge onto the appliance body.

59. The method of any one of embodiments 34 through 58, wherein the three-dimensional dental anatomy of the patient further includes at least some portion of tooth roots, gingiva, periodontal ligaments (PDL), alveolar bone, or cortical bone.

60. The method of any one of embodiments 34 through 59, wherein determining the removable dental appliance design comprises accepting, by the computing device, input from a user, and wherein the input influences at least one of the dimensions and shapes.

61. The method of any one of embodiments 34 through 60, wherein determining the removable dental appliance design comprises automatically determining, by the computing device, at least one of the position of the gingival ridge or the dimensions and shapes of at least one of the shell and the gingival ridge.

62. The method of any one of embodiments 34 through 61, wherein determining the removable dental appliance design comprises presenting, by the computing device, a representation of the removable dental appliance to a user for review.

63. The method of any one of embodiments 34 through 62, wherein transmitting the representation of the removable dental appliance comprises sending, by the computing device, a digital model of the removable dental appliance from the computing device to the computer-aided manufacturing system, and wherein the method further comprises manufacturing at least a portion of the removable dental appliance with the computer-aided manufacturing system according to the digital model.

64. The method of embodiment 63, wherein the computer-aided manufacturing system comprises a 3D printer, and wherein at least some portion of the removable dental appliance is formed using the 3D printer.

65. The method of any one of embodiments 34 through 64, further comprising determining, by the computing device, the removable dental appliance design of each of an ordered set of removable dental appliances for the patient, the removable dental appliance being one of the ordered set of removable dental appliances for the patient, wherein each removable dental appliance in the ordered set of removable dental appliances is configured to incrementally reposition at least one tooth of the plurality of teeth to a more advanced position than any one of the earlier removable dental appliances within the set of the removable dental appliances.

66. The method of any one of embodiments 34 to 65, wherein determining, by the computing device, dimensions and shapes of the removable dental appliance includes selecting, by the computing device, the dimensions and shapes of the removable dental appliance according to a set of predefined design constraints, the set of predefined design constraints including one or more of a group consisting of:
   a minimum and a maximum localized force applied to one or more of the surrounded teeth, the shell, or the gingival ridge;
   a minimum and a maximum rotational force applied to one or more of the surrounded teeth, the shell, or the gingival ridge;
   a minimum and a maximum translational force applied to one or more of the surrounded teeth, the shell, or the gingival ridge;
   a minimum and a maximum total force applied to one or more of the surrounded teeth, the shell, or the gingival ridge; and
   a minimum and a maximum strain applied to the removable dental appliance when worn by the patient.

67. The method of any one of embodiments 34 to 66, wherein determining the removable dental appliance design includes modifying, by the computing device, the initial positions of one or more teeth of the patient to produce a modified dental anatomy, wherein the modified dental anatomy represents an incremental repositioning of the one or more teeth of the patient as compared to the initial positions of the one or more teeth of the patient, and wherein the removable dental appliance design conforms to the modified dental anatomy.

68. The method of any one of embodiments 34 to 67, wherein the computing device includes a plurality of computing devices operably connected via one or more computer networks.

69. A non-transitory computer-readable storage medium that stores computer system-executable instructions that, when executed, configure a processor to perform the method of any of embodiments 34 to 68.

What is claimed is:

1. A method comprising:
    receiving, by a computing device, a digital representation of a three-dimensional dental anatomy of a patient, the dental anatomy providing initial positions of a plurality of teeth;
    determining, by the computing device, a movement of a tooth of the plurality of teeth from the initial position of the tooth to a desired position of the tooth;
    determining, by the computing device, a force vector applied at a contact point on the tooth to achieve the movement;
    determining, by the computing device, a removable dental appliance design comprising a position of a gingival ridge on a removable dental appliance to cause the force vector, wherein the removable dental appliance comprises an appliance body configured to at least partially surround a plurality of teeth of the patient, wherein the appliance body comprises:
        a shell shaped to engage the tooth in the initial position of the tooth; and
        a gingival ridge extending at least from a first interproximal region of the appliance body at a mesial portion of the shell along a gingival edge of the shell to a second interproximal region of the appliance body at a distal portion of the shell,
        wherein the gingival ridge is configured to engage a lingual surface of the tooth below a height of contour of the tooth or a labial surface of the tooth below the height of contour to enable the appliance body to apply a force vector at a contact point on the tooth to cause movement of the tooth toward a desired position of the tooth when the removable dental appliance is worn by the patient, and wherein the gingival ridge results in a gingival portion of the appliance body being stiffer than a labial face of the shell or a lingual face of the shell; and
    transmitting, by the computing device, a representation of the removable dental appliance to a computer-aided manufacturing system.

2. The method of claim 1, and further comprising fabricating a removal dental appliance based on the representation.

3. The method of claim 1, wherein the movement comprises a tooth root movement, a rotation, or a torque.

4. The method of claim 1, wherein determining the movement of the tooth comprises determining, by the computing device, a plurality of movements, each movement of the plurality of movements corresponding to a respective movement of a respective tooth of the plurality of teeth from an initial position of the respective tooth to a desired position of the respective tooth, the method further comprising ordering the plurality of movements by difficulty or length of expression to prioritize the plurality of movements.

5. The method of claim 1, wherein determining the removable dental appliance design comprises determining, by the computing device, the position of the gingival ridge on the appliance body and dimensions and shapes of the gingival ridge to distribute a deformation force to the appliance body at the first interproximal region and the appliance body at the second interproximal region when the removable dental appliance is worn by the patient.

6. The method of claim 1, wherein determining the removable dental appliance design comprises determining, by the computing device, dimensions and shapes of a surface of the shell, wherein the surface defines a void internal to the shell, wherein the surface is shaped to receive the tooth in a desired position, and wherein the gingival ridge extends from an interior surface of the appliance body into the void.

7. The method of claim 6, wherein determining the removable dental appliance design comprises determining, by the computing device, the position of the gingival ridge on the appliance body and dimensions and shapes of the gingival ridge to urge an occlusal portion of the surface toward an occlusal surface of the tooth when the removable dental appliance is worn by the patient.

8. The method of claim 6, wherein determining the force vector comprises determining, by the computing device, the force vector applied at the contact point on the tooth opposite from a portion of the void to cause movement of the tooth toward the portion of the void when the removable dental appliance is worn by the patient.

9. The method of claim 1, wherein the gingival ridge comprises a first gingival ridge portion and a second gingival ridge portion, and wherein determining the removable dental appliance design comprises:
    determining, by the computing device, dimensions and shapes of the first gingival ridge portion extending from the first interproximal region of the appliance body at the mesial portion of the shell to a first position on the gingival edge of the shell; and
    determining, by the computing device, dimensions and shapes of the second gingival ridge portion extending from a second position on the gingival edge of the shell to the second interproximal region of the appliance body at the distal portion of the shell.

10. The method of claim 1, wherein determining the removable dental appliance design comprises determining, by the computing device, a cross-section of the gingival ridge, and wherein the cross-section of the gingival ridge is substantially constant along the gingival edge of the appliance body or varies along the gingival edge of the appliance body.

11. The method of claim 1, wherein determining the removable dental appliance design comprises determining, by the computing device, a variation in a modulus of the gingival ridge along a length of the gingival ridge.

12. The method of claim 1, wherein determining the removable dental appliance design comprises determining, by the computing device, a position of a second gingival ridge extending from a third interproximal region at a mesial portion of the shell along a gingival edge of the shell to a fourth interproximal region of the appliance body at a distal portion of the shell.

13. The method of claim 1, wherein the appliance body further comprises:
    a second shell adjacent to the shell in a mesial direction, wherein the second shell is shaped to engage a second tooth of the plurality of teeth in an initial position of the second tooth; and
    a third shell adjacent to the shell in a distal direction, wherein the third shell is shaped to engage a third tooth of the plurality of teeth in an initial position of the third tooth,
    wherein determining the removable dental appliance design comprises determining, by the computing device, a position of the gingival ridge extending at least from a portion of the second shell to a portion of the third shell.

14. The method of claim 1, wherein the appliance body further comprises a reinforcing rib, and wherein determining the removable dental appliance design comprises:

determining, by the computing device, a position of the reinforcing rib on an exterior lingual surface or an exterior labial surface of the appliance body; and determining, by the computing device, dimensions and shapes of the reinforcing rib to result in the appliance body at the reinforcing rib being stiffer that adjacent portions of the appliance body.

15. The method of claim 1, wherein forming the removable dental appliance comprises three-dimensional printing the removable dental appliance and the gingival ridge as an integral piece.

16. The method of claim 1, wherein the three-dimensional dental anatomy of the patient further includes at least some portion of tooth roots, gingiva, periodontal ligaments (PDL), alveolar bone, or cortical bone.

17. The method of claim 1, wherein determining the removable dental appliance design comprises accepting, by the computing device, input from a user, and wherein the input influences at least one of the dimensions and shapes.

18. The method of claim 1, wherein determining the removable dental appliance design comprises presenting, by the computing device, a representation of the removable dental appliance to a user for review.

19. The method of claim 1, further comprising determining, by the computing device, the removable dental appliance design of each of an ordered set of removable dental appliances for the patient, the removable dental appliance being one of the ordered set of removable dental appliances for the patient, wherein each removable dental appliance in the ordered set of removable dental appliances is configured to incrementally reposition at least one tooth of the plurality of teeth to a more advanced position than any one of the earlier removable dental appliances within the set of the removable dental appliances.

20. The method of claim 1, wherein determining, by the computing device, dimensions and shapes of the removable dental appliance includes selecting, by the computing device, the dimensions and shapes of the removable dental appliance according to a set of predefined design constraints, the set of predefined design constraints including one or more of a group consisting of:

a minimum and a maximum localized force applied to one or more of the surrounded teeth, the shell, or the gingival ridge;

a minimum and a maximum rotational force applied to one or more of the surrounded teeth, the shell, or the gingival ridge;

a minimum and a maximum translational force applied to one or more of the surrounded teeth, the shell, or the gingival ridge;

a minimum and a maximum total force applied to one or more of the surrounded teeth, the shell, or the gingival ridge; and a minimum and a maximum strain applied to the removable dental appliance when worn by the patient.

\* \* \* \* \*